(12) United States Patent
Soane et al.

(10) Patent No.: US 6,617,267 B2
(45) Date of Patent: Sep. 9, 2003

(54) MODIFIED TEXTILE AND OTHER MATERIALS AND METHODS FOR THEIR PREPARATION

(75) Inventors: David S. Soane, Peidmont, CA (US); David A. Offord, Castro Valley, CA (US)

(73) Assignee: Nano-Tex, LLC, Emeryville, CA (US)

(*) Notice: Subject to any disclaimer, the term of this patent is extended or adjusted under 35 U.S.C. 154(b) by 0 days.

(21) Appl. No.: 10/059,657

(22) Filed: Jan. 29, 2002

(65) Prior Publication Data

US 2002/0155771 A1 Oct. 24, 2002

Related U.S. Application Data

(62) Division of application No. 09/274,749, filed on Mar. 23, 1999, now Pat. No. 6,379,753.
(60) Provisional application No. 60/117,641, filed on Jan. 28, 1999, provisional application No. 60/105,890, filed on Oct. 27, 1998, provisional application No. 60/093,911, filed on Jul. 23, 1998, provisional application No. 60/093,820, filed on Jul. 23, 1998, and provisional application No. 60/080,185, filed on Mar. 24, 1998.

(51) Int. Cl.$^7$ ............................................. B32B 27/12
(52) U.S. Cl. ....................................................... 442/79
(58) Field of Search .............................................. 442/79

(56) References Cited

U.S. PATENT DOCUMENTS

| | | | |
|---|---|---|---|
| RE28,914 E | 7/1976 | Marco | |
| 4,029,867 A | 6/1977 | Wasley et al. | |
| 4,032,495 A | 6/1977 | Perronin et al. | |
| 4,043,965 A | 8/1977 | Dickson | |
| 4,296,224 A | 10/1981 | Fukui | 526/243 |
| 4,314,805 A | 2/1982 | McKnight | 8/137 |

(List continued on next page.)

FOREIGN PATENT DOCUMENTS

| | | |
|---|---|---|
| CA | 2182146 A1 | 1/1997 |
| DE | 3818391 A1 | 12/1988 |
| DE | 4035378 A1 | 5/1992 |
| DE | 19520989 A1 | 12/1996 |
| EP | 0 294 648 | 12/1988 |
| EP | 0 300370 A2 | 1/1989 |
| EP | 0 508 136 | 10/1992 |
| EP | 0 573 526 B1 | 3/1996 |
| EP | 0 648 890 B1 | 12/1996 |
| EP | 0 756 033 A2 | 1/1997 |

(List continued on next page.)

OTHER PUBLICATIONS

Hoffman, A.S. *Macromol. Symp.* 98, 645–664 (1995).

*Primary Examiner*—Elizabeth M. Cole
(74) *Attorney, Agent, or Firm*—Jacqueline S. Larson

(57) ABSTRACT

Provided are compounds and methods for modifying a material to change properties of the material, as well as a variety of products obtained using the methods. The material which is modified may be, for example, a carbohydrate, and the modifiable functional groups on the material may be hydroxyls. Multifunctional molecules for use in modifying the surfaces of materials such as textile fibers, yarns and other fabrics made of or, including cotton, wool and nylon, are provided. The multifunctional molecules can include hydrophobic regions and/or hydrophilic regions. The multifunctional molecules also may include binding functional groups that permit either non-covalent or covalent binding to the material being modified, thus permitting the multifunctional molecule to form a non-covalent or covalent coating on the material. The methods and compounds disclosed herein may be used to modify materials to improve properties such as resistance, grease repellency, soil resistance permanent press properties, and quickness of drying.

12 Claims, 21 Drawing Sheets

U.S. PATENT DOCUMENTS

| | | | |
|---|---|---|---|
| 4,463,127 A | 7/1984 | Alberts | 524/731 |
| 4,590,236 A | 5/1986 | Koenig et al. | 524/460 |
| 4,778,915 A | 10/1988 | Lina et al. | 560/294 |
| 4,820,307 A | 4/1989 | Welch et al. | |
| 4,971,835 A | 11/1990 | Munch | 427/421 |
| 5,178,915 A | 1/1993 | Moyle | 427/318 |
| 5,221,285 A | 6/1993 | Andrews et al. | |
| 5,362,847 A | 11/1994 | Miller et al. | 528/403 |
| 5,516,578 A | 5/1996 | Coppens | |
| 5,534,604 A | 7/1996 | Bildhauer et al. | |
| 5,543,214 A | 8/1996 | Groshens et al. | 428/261 |
| 5,589,028 A | 12/1996 | Robinson | 156/306.6 |
| 5,594,125 A | 1/1997 | Seyschab et al. | 536/103 |
| 5,616,287 A | 4/1997 | Finter | 252/518 |
| 5,707,708 A | 1/1998 | Pechhold | |
| 5,725,789 A | 3/1998 | Huber et al. | |
| 5,834,088 A | 11/1998 | Pechhold | |
| 5,876,617 A | 3/1999 | Sato et al. | |
| 5,919,527 A | 7/1999 | Fitzgerald | 427/389.1 |
| 6,140,408 A | 10/2000 | McCarthy | 524/506 |
| 6,281,287 B1 | 8/2001 | Montanari | 525/63 |
| 6,379,753 B1 | 4/2002 | Soane et al. | |
| 6,380,336 B1 | 4/2002 | Soane et al. | |

FOREIGN PATENT DOCUMENTS

| | | |
|---|---|---|
| EP | 1 004 701 | 5/2000 |
| GB | 809745 | 3/1959 |
| WO | WO 92/10605 | 6/1992 |
| WO | WO 92/12286 | 7/1992 |
| WO | WO 92/15748 | 9/1992 |
| WO | WO 92/17636 | 10/1992 |
| WO | WO 92/19680 | 11/1992 |
| WO | WO 97/11218 | 3/1997 |
| WO | WO 98/00500 | 1/1998 |

Poly(maleic anhydride-co-fluoroalkene-co-hydroalkene)

Poly(maleic anhydride-co-fluoroalkene-co-hydroalkene)

Poly(maleic anhydride-co-fluoroalkene-co-hydroalkene)

Poly(maleic anhydride)

↓ HO—Carbohydrate (eg, cellulose, starch, etc)

↓ Wool Clothing
H₂O, NaH₂PO₂, heat

Poly(maleic anhydride)

↓ HO—Carbohydrate (eg, cellulose, starch, etc)

↓ Wool Clothing
H₂O, NaH₂PO₂, heat

MODIFIED TEXTILE AND OTHER MATERIALS AND METHODS FOR THEIR PREPARATION

CROSS REFERENCE TO RELATED APPLICATIONS

This application is a divisional application of Application Ser. No. 09/274,749, filed Mar. 23, 1999, now U.S. Pat. No. 6,379,753 which claims the benefit of U.S. Provisional Patent Applications Serial No. 60/080,185, filed Mar. 24, 1998; Serial No. 60/093,820, filed Jul. 23, 1998; Serial No. 60/093,911, filed Jul. 23, 1998; Serial No. 60/105,890, filed Oct. 27, 1998; and Serial No. 60/117,641, filed Jan. 28, 1999; the disclosures of which are incorporated herein by reference in their entireties.

TECHNICAL FIELD

This invention relates generally to methods for the modification of textile and other materials, for example by the attachment of hydrophobic moieties, to impart properties thereon such as water repellency and permanent press.

BACKGROUND ART

Most chemical research in the textile field was conducted in the 1950s, 60s, and 70s. This work has been extensively reviewed. For example, see: Smith and Block, *Textiles in Perspective*, Prentice-Hall, Englewood Cliffs, N.J., 1982; *Handbook of Fiber Science and Technology*, Marcel Dekker, New York, N.Y., Vols. I–III, 1984; S. Adanur, *Wellington Sears Handbook of Industrial Textiles*, Technomic Publishing Company, Inc., Lancaster, Pa., 1995; and Philip E. Slade, *Handbook of Fiber Finish Technology*, Marcel Dekker, New York, 1998). A large majority of this published research was never commercialized due to inhibitory costs or the impracticality of integration into textile production processes. There has been less research in this area in recent years. Most current integration into textile production processes. There has been less research in this area in recent years. Most current work is centered on optimizing existing technology to reduce costs and comply with recent government regulations.

Methods have been developed in the art for making textile materials water repellent. The terms "water repellent" and "waterproof" are distinguishable as related to textiles. Water repellent fabrics generally have open pores and are permeable to air and water vapor. Waterproofing involves filling the pores in the fabric with a substance impermeable to water, and usually to air as well. For the purpose of everyday clothing, water repellent fabric is preferable because of the comfort afforded by the breathability of the clothing.

Current commercial processes for producing water repellent fabrics are based on laminating processes (C. J. Painter, *Journal of Coated Fabrics*, 26:107–130 (1996)) and polysiloxane coatings (Philip E. Slade, *Handbook of Fiber Science and Technology*, Marcel Dekker, New York, N.Y., Vol. 11, 1984, pp. 168–171). The laminating process involves adhering a layer of polymeric material, such as Teflon®, that has been stretched to produce micropores, to a fabric. Though this process produces durable, water repellent films, it suffers from many disadvantages. The application of these laminants requires special equipment and therefore cannot be applied using existing textile processes. Production of the film is costly and garments with this modification are significantly more expensive than their unmodified counterparts. The colors and shades of this clothing can be limited by the coating laminate film color or reflectance. Finally, clothing made from this material tends to be heavier and stiffer than the untreated fabric. This material also can be disadvantageous due to mismatched expansion and shrinkage properties of the laminate. Polysiloxane films suffer from low durability to laundering which tends to swell the fabric and rupture the silicone film.

Methods of imparting hydrophobic character to cotton fabric have been developed including the use of hydrophobic polymer films and the attachment of hydrophobic monomers via physi- or chemisorptive processes. Repellents used based on monomeric hydrocarbon hydrophobes include aluminum and zirconium soaps, waxes and waxlike substances, metal complexes, pyridinium compounds, methylol compounds, and other fiber reactive water repellents.

One of the earliest water repellents was made by non-covalently applying water soluble soap to fiber and precipitating it with an aluminum salt. *J. Text. Res.* 42:691 (1951). However, these coatings dissolve in alkaline detergent solution, therefore washfastness is poor. Zirconium soaps are less soluble in detergent solutions (Molliet, *Waterproofing and Water-Repellency*, Elsevier Publ. Co., Amsterdam, 1963, p. 188); however, due to the non-covalent attachment to the fabric, abrasion resistance and wash fastness are poor. Fabric also has been made water repellent by coating it with a hydrophobic substance, such as paraffin. Text. Inst. Ind. 4:255 (1966). Paraffin emulsions for coating fabrics are available, for example, Freepel® (BF Goodrich Textile Chemicals Inc., Charlotte, N.C.). Waxes are not stable to laundering or dry cleaning. Durability is poor due to non-covalent coating of the fabric and breathability is low.

Quilon chrome complexes polymerize to form —Cr—O—Cr— linkages (R. J. Pavlin, *Tappi*, 36:107 (1953)). Simultaneously, the complex forms covalent bonds with the surface of fibers to produce a water repellent semi-durable coating. Quilon solutions require acidic conditions to react thus causing degradation of the fiber through cellulose hydrolysis. Fabric colors are limited by the blue-green coloration imparted by the complex.

Pyridinium-type water repellents have been reviewed by Harding (Harding, *J. Text. Res.*, 42:691 (1951)). For example, an alkyl quaternary ammonium compound is reacted with cellulose at elevated temperatures to form a durable water-repellent finish on cotton (British Patent No. 466,817). It was later found that the reaction was restricted to the surface of the fibers (Schuglen et al., *Text. Res. J.*, 22:424 (1962)) and the high cure temperature weakened the fabric. Pyridine liberated during the reaction has an unpleasant odor and the fabric had to be scoured after the cure. The toxicological properties of pyridine ended its use in the 1970s when government regulations on such substances increased.

Methylol chemistry has been extensively commercialized in the crosslinking of cellulose for durable press fabrics. N-methylol compounds are prepared by reaction of an amine or amide with formaldehyde. Alkyl-N-methylol compounds can be reacted at elevated temperatures in the presence of an acidic catalyst with the hydroxyl groups of cellulose to impart durable hydrophobic qualities to cotton. British Patent Nos. 463,300 (1937) and 679,811 (1952). The reaction with cellulose is accompanied by formation of non-covalently linked (i.e., non-durable) resinous material, thus decreasing efficiency. In addition, the high temperature and acid catalyst reduces the strength of the fabric. Recently, the commercial use of methylol compounds has been decreasing due to concerns of toxic formaldehyde release from fabrics treated in such a manner.

Long-chain isocyanates have been used to hydrophobically modify cotton. British Patent No. 461,179 (1937); Hamalainen, et al., Am. Dyest. Rep., 43:453 (1954); and British Patent No. 474,403 (1937)). The high toxicity of isocyanates and significant side reactions with water, however, precluded it from commercial use. To circumvent the water sensitivity of isocyanates, alkyl isocyanates were reacted with ethylenimine to yield the less reactive aziridinyl compound which was subsequently reacted with cellulose. German Patent No. 731,667 (1943); and British Patent No. 795,380 (1958). Though the toxicity of the aziridinyl compound was reduced compared to the isocyanate, the procedure still required the handling of toxic isocyanate precursors. Also, the high cure temperature weakened the cellulose and crosslinkers were needed to increase structural stability. Alkyl epoxides have been reacted with cellulose under acidic or basic conditions to produce water repellent cotton. German Patent No. 874,289 (1953). Epoxides are, in general however, not very reactive and require long reaction times at high temperatures and therefore have not been extensively commercialized.

Acylation of cotton with isopropenyl stearate from an acidic solution of benzene and curing was used to produce a hydrophobic coating for cotton. U.S. Pat. No. 4,152,115. The high cure temperature and acid catalyst however weakens the cotton. This method disadvantageously uses carcinogenic and flammable solvents. The practicality of using flammable solvents in fabric finishings is limited. Alkyl vinyl sulfones have been reacted with cellulose in the presence of alkali to form a water repellent finish. U.S. Pat. No. 2,670,265. However, this method has not been commercialized because the alkali is not compatible with crosslinking reactants required for permanent press treatments.

Methods have been developed for imparting grease repellent properties to materials such as cotton. Perfluoroalkanoic acids have been applied in a variety of ways including as chromium complexes and as quaternary amines. U.S. Pat. No. 2,662,835; Phillips et al., Text. Res. J., 27:369 (1957); Tripp et al., Text. Res. J., 27:340 (1957); and Segal et al, Text. Res. J., 28:233 (1958). Since these finishes are non-covalently linked to the fabric, they are not durable to laundering. Attempts were made to covalently link fluorocarbons to cotton with perfluorinated acid chlorides in the presence of the base pyridine and dimethylformamide solvent (Benerito et al., Text. Res. J., 30:393–399 (1960)), however significant problems were encountered. The pyridine base formed an insoluble complex with the acid chloride that could only be overcome with the addition of large excesses of pyridine or the solvent dimethylformamide. Also, the finish was readily subject to hydrolysis and not durable to laundering. Repellent finishes made by reaction of glycidyl ethers of 1,1-dihydrofluoroalkanols with cellulose (Berni et al., Text. Res. J., 30:576–586 (1960)) produced a more durable finish, but required a reaction time of 30 h at 100° C. and were not extensively commercialized. Interest in monomeric fluorocarbon finishes has been superseded by the use of fluorinated polymer films.

Methods also have been developed for modifying cotton by crosslinking in order to impart permanent press properties to the material. These methods have been reviewed in: R. M. Rowell and R. A. Young, Eds., Modified Cellulosics, Academic Press, New York, 1978; M. Levin and S. Sello, Eds., Handbook of Fiber Science and Technology, Vol. 2, Part A, Marcel Dekker, New York, 1984, pp. 1–318; and G. Hermanson, Bioconjugate Techniques, Academic Press, San Diego, Calif., 1996, pp. 169–297. The covalent crosslinks prevent the cellulose chains from slipping, thus imparting high durable press characteristics. However, the short and stiff crosslinks cause the cotton structure to become brittle and display poor tear strength. A variety of textile resins have been developed to crosslink cellulose and impart durable-press properties, such as polymethylol compounds formed by the reaction of aldehydes with amines. They include melamineformaldehyde (British Patent Nos. 458,877, 466,015 and 468,677), dimethylolethyleneurea (U.S. Pat. Nos. 2,416,046, 2,416,057, 2,425,627, 2,436,311, 2,373,136, and 2,899,263; and British Patent Nos. 603,160 and 577,735), and urons/triazones (U.S. Pat. Nos. 2,373,135; and 2,321,989; British Patent Nos. 575,260 and 845,468; German Patent No. 1,123,334; Angew. Chem., 60:267 (1948); Am. Dyest. Rep., 48:44 (1959); and Tex. Res J., 29:170 (1959).

Dimethyloldihydroxyethyleneurea (DMDHEU) has been used in the production of durable-press garments. Text. Res. J., 51:601 (1981). However, the DMDHEU system retains chlorine and causes yellowing and tendering of the cloth; therefore it is not suitable for use with white cloth. Resins have been developed specifically for use with white cloth that are esters of carbamic acid (carbamates). U.S. Pat. Nos. 3,639,455, and 4,156,784; Japanese Patent No. 599,505; British Patent Nos. 1,227,366, and 1,523,308; and French Patent Nos. 1,576,067 and 7,532,092. The crosslinking of the cellulose and polymerization of the resin generally occurs at the same time on the fabric. U.S. Pat. Nos. 5,447,537, 4,975,209, 4,936,865, 4,820,307, and 3,995,998.

Methods for modifying materials with reactive groups such as hydroxyls and amines have been developed in the art, however, materials with hydroxyl groups, including polysaccharides such as cellulose, have been found to be difficult to covalently modify and therefore require reactive modifiers or extreme conditions. Methods of reacting with hydroxyls that have been developed in the chemistry field include the use of acid chlorides, anhydrides, succinimides, and carbonyldiimidazole. See, e.g., J. March, "Advanced Organic Chemistry-Reactions, Mechanisms and Structure,", 3rd Ed., John Wiley and Sons, New York, 1995; and G. Hermanson, "Bioconjugate Techniques," Academic Press, Inc., San Diego, 1996.

There is a need for methods for modifying various substrate materials, such as textile fibers of cotton or other cellulosic materials, wool, silk and other proteinaceous fibers, and various other natural, man made, regenerated and synthetic fiber materials to alter and optimize their properties for use in different applications. There is a need for methods for improving the properties of cloth or fabric materials containing various natural, man made, regenerated and/or synthetic fibers of various types, in order to improve various performance properties such as water resistance, soil resistance, speed of drying and permanent press properties. There further is a need for methods for producing modified textile fiber materials and other substrates which may be used in a wide range of applications including clothing and apparel fabrics, and various items of apparel, socks and hosiery, and fabrics for footwear and comfort and shoes, home furnishing fabrics for upholstery and window treatments including curtains and draperies, and fabrics for outdoor furniture and equipment, as well as for industrial textile end uses.

DISCLOSURE OF THE INVENTION

Provided are methods of modifying various substrate materials to alter the properties of the materials. Also provided are a variety of materials produced by the methods disclosed herein. In particular, compositions and methods are provided that permit the modification of a variety of textile fiber materials and similar substrates to alter properties including water repellency, grease repellency, soil resistance, oil or grease resistance, permanent press, detergent free washing, increased speed of drying, and improving strength and abrasion resistance, and to improve comfort, where such fibers are used alone, or in combinations or blends with one or more of the others before or after treatment.

In one embodiment, provided are methods of modifying a material to increase its hydrophobicity as well as a variety of products obtained using the methods. The material which is modified may comprise, for example, a carbohydrate or protein, and the modifiable functional groups on the material may comprise hydroxyls, or amino acid side chains.

In one embodiment, a method of modifying a textile material, for example, a cellulosic, such as cotton, or regenerated or man made cellulosic, or a synthetic polyamide such as nylon, or a natural polyamide, such as wool or a regenerated protein, is provided, the method comprising attaching a multifunctional polymer to the material, wherein the multifunctional polymer comprises hydrophobic groups and hydrophilic groups. The multifunctional polymer may be attached to the material noncovalently via noncovalent interactions between the polymer and the material. The multifunctional polymer may comprise reactive groups, and thus may be attached to the material covalently by reaction of reactive groups on the polymer with reactive groups on the material. Reactive groups include amine, hydroxyl, carboxyl, amide, beta-ketoester, aldehyde, anhydride, acyl chloride, carboxylic acid hydrazide, oxirane, isocyanate, and methylolamide groups. The textile material may comprise, e.g., a hydrophobic or hydrophilic surface.

The multifunctional polymer may be a copolymer comprising hydrophobic and hydrophilic regions. The multifunctional polymer may be formed, for example, by polymerization of hydrophobic monomers and hydrophilic monomers. In one embodiment, the multifunctional polymer is a polysaccharide modified by the covalent attachment of a molecule comprising hydrophobic groups, or a poly(amino acid) modified by the covalent attachment of a molecule comprising hydrophobic groups. The multifunctional polymer may comprises a comb or graft copolymer, for example, with a hydrophobic synthetic polymer backbone and hydrophilic groups grafted thereto. For example, the synthetic polymer backbone may comprise a polymer such as a polyester, polypropylene, polyethylene or copolymer thereof, and the grafted hydrophilic groups may comprise polypeptide or polysaccharide moieties.

A variety of multifunctional polymers are provided. The multifunctional polymer may comprise a hydrophilic polymer comprising a plurality of reactive groups. In another embodiment, the multifunctional polymer may comprise polymerized monomers, such as 2-(acetoacetoxy)ethyl methacrylate, N-acroyloxysuccinimide, acrolein, acrylic anhydride, allylsuccinic anhydride, citraconic anhydride, 4,4'-hexafluoro-iso-propylidenebisphthalic anhydride, methacrylic anhydride, 4-methacryloxyethyl trimellitic anhydride, acryloyl chloride, methacryloyl chloride, adipic acid dihydrazide, allyl glycidyl ether, glycidyl acrylate, glycidyl methacrylate, α,α-dimethyl-3-isopropenylenzyl isocyanate, N-methylolacrylamide, and N-methylolmethacrylamide.

The multifunctional polymer may comprise a polymer such as a polyacetal, polyacrolein, poly(methyl isopropenyl ketone), poly(vinyl methyl ketone), poly(ethylene glycol) modified to comprise aldehyde groups, poly(ethylene glycol) modified to comprise carbonyldiimidazole groups, poly(acrylic anhydride), poly(alkalene oxide/maleic anhydride) copolymers, poly(azelaic anhydride), poly(butadiene/maleic anhydride) copolymers, poly(ethylene/maleic anhydride) copolymers, poly(maleic anhydride), poly(maleic anhydride/1-octadecene) copolymers, poly(vinyl methyl ether/maleic anhydride) copolymers, poly(styrene/maleic anhydride) copolymers, poly(acrylolyl chloride), poly(methacryloyl chloride), chlorinated polydimethylsiloxane chlorinated polyethylene, chlorinated polyisoprene, chlorinated polypropylene, chlorinated poly(vinyl chloride), poly(ethylene glycol) modified to comprise epoxides, poly(ethylene glycol) modified to comprise isocyanate groups, poly(glycidyl methacrylate), poly(acrylic hydrazide/methyl acrylate) copolymers, succinimidyl ester polymers, poly(ethylene glycol) modified to comprise succinimidyl ester groups, poly(ethylene glycol) modified to comprise tresylate groups, and poly(ethylene glycol) modified to comprise vinyl sulfone groups.

In one embodiment, a method of modifying a material is provided, the method comprising attaching a multifunctional polymer to the material, wherein the multifunctional polymer is capable of non-covalently or covalently binding the material, and wherein the multifunctional polymer is a modified poly(maleic anhydride) polymer. The multifunctional polymer may be attached to the material covalently via a reaction between functional groups on the polymer and the material, or noncovalently via noncovalent interactions between the polymer and the material.

The modified poly(maleic anhydride) polymer may comprise a poly(maleic anhydride) polymer modified by the covalent attachment of a hydrophobic molecule. In one embodiment, the modified poly(maleic anhydride) polymer comprises anhydride groups, and the polymer comprises hydroxyl or amino groups, and the polymer is attached to the material via the formation of ester or amide bonds between the polymer and the material.

The modified poly(maleic anhydride) polymer may be formed by the reaction of a poly(maleic anhydride) polymer comprising carboxy or anhydride groups with a hydrophobic molecule comprising a hydroxyl or amine group, thereby to attach the hydrophobic molecule to the poly(maleic anhydride) polymer via an ester or amide bond. The hydrophobic molecule may have, for example, the formula R-X, where R is a C8–24 hydrocarbon or fluorocarbon, and X is OH or $NH_2$.

In one embodiment, the modified poly(maleic anhydride) is a copolymer of maleic anhydride and a polymerizable molecule, e.g., vinyl, acrylate, methacrylate, styrene, alkyne, glycidyl acrylate, glycidyl methacrylate, vinyl ether (allyl), acrylamide and methacrylamide, comprising a hydrophobic group, for example, a hydroalkylalkene or a fluoralkyl alkene. The modified poly(maleic anhydride) polymer may be formed by copolymerization of maleic anhydride and an alkene comprising a hydrophobic group, optionally followed by hydrolysis of anhydrides on the resulting polymer to form free carboxyl groups on the modified polymer. In another embodiment, the modified poly(maleic anhydride) polymer is a poly(maleic anhydride) polymer comprising covalently attached polyamide groups, such as nylon, wool or silk groups. In another embodiment, the modified poly(maleic anhydride) polymer comprises a poly(maleic anhydride) polymer comprising covalently attached polysaccharide groups, such as dextran, starch or cellulose groups.

Also provided is a method of modifying a textile material, the method comprising attaching an upper critical solution temperature polymer to the material. The multifunctional polymer may be attached to the material noncovalently via noncovalent interactions between the polymer and the material, or the polymer may comprise reactive groups, and the polymer may be attached to the material covalently by reaction of reactive groups on the polymer with reactive groups on the material. Exemplary polymers include poly (ethylene oxide), alkylpoly(ethylene oxide), poly(propylene oxide), poly(vinyl methyl ether), hydroxypropyl acrylate, hydroxypropyl methylcellulose, hydroxypropyl cellulose, hydroxyethyl cellulose, methylcellulose, poly (vinyl alcohol), poly (N-substituted acrylamides), poly (N-acryloyl pyrrolidine), poly (N-acryloyl piperidine), poly (acryloyl-L-amino acid esters), poly(ethyl oxazoline), poly (methacrylic acid), and copolymers and triblock polymers thereof.

The methods disclosed herein may be used to modify various substrate materials, such as textile fibers of cotton or other cellulosic materials, wool, silk and other proteinaceous fibers, and various other natural, regenerated and synthetic fiber materials to alter and optimize their properties for use in different applications. Materials containing various natural, man made and/or synthetic fibers in the form of yarn, cloth or fabric of various types may be modified, in order to improve various performance properties such as water resistance, soil resistance, oil or grease resistance, speed of drying and such permanent press properties as smoothness or wrinkle resistance, and "wash and wear".

Materials comprising cellulose may be modified and are described by way of example. A variety of other materials, such as leather, other polysaccharides or polyamines, also may be modified, for example, to improve their hydrophobicity by the covalent attachment of hydrophobic groups. Cellulose containing materials which may be modified include cotton materials and various types of regenerated cellulose, such as rayon, including viscose rayon and lyocell and other natural celluloses such as linen, ramie and the like, in fiber, yarn or fabric form, which may be either undyed or dyed prior to the modification. Hydrophobic cellulosic material can be modified with attached hydrophobic groups to improve properties of the cellulosic substrate such as water resistance and permanent press properties. Proteinaceous fibers including silk, wool, camel's hair, alpaca and other animal hairs and furs and regenerated protein fibers may be modified, as well as synthetic fibers including polyamides, such as nylon 6 and 66, various polyesters including polyethylene glycol terephthalate and derivatives thereof, and polytrimethylene terephthalate and other synthetic fibers. Various ones of these types of fibers also can be blended with one or more of the others, before or after treatment, e.g., cotton and/or rayon and polyester, or wool and polyester, together, or with silk, linen or rayon added. The modified materials obtained as disclosed herein may be used in a variety of applications, such as the fabrication of clothing and various items of wearing apparel, socks, hosiery, footwear, and shoes, home furnishing fabrics including upholstery and window treatments including curtains and draperies, and fabrics for outdoor furniture and equipment, as well as for other industrial textile end uses.

MODES FOR CARRYING OUT THE INVENTION

Figure 1:
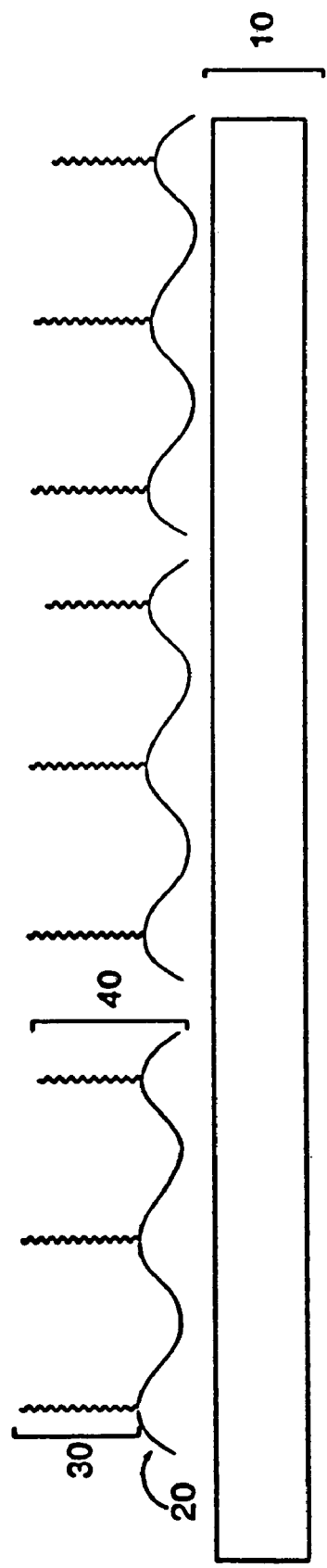
FIG. 1 shows a material comprising surface poly(amino acids) or cellulose modified by the non-covalent attachment of a hydrophobically modified hydrophilic polymer, such as a carbohydrate, a protein, polyacrylic acid, or poly(maleic anhydride).

Methods and compounds for modifying materials, as well as modified materials produced by the methods are provided. Using the methods disclosed herein, a variety of materials including textiles, such as cellulosic textile materials, including cotton fibers, as well as fibers of proteinaceous materials such as wool and silk, and synthetic fiber materials, such as nylon, and various man made materials, such as regenerated cellulose or regenerated protein, are modified to impart selected properties on or to the material. Desirable properties that can be imparted on or to the modified materials include water repellency, durability to dry cleaning and laundering, detergent free washing, increased speed of drying, resistance to abrasion and soiling, grease resistance, increased strength, and enhanced comfort.

Materials

A variety of materials, including textile fibers, yarns and fabrics can be modified as disclosed herein. The materials can be modified in one embodiment by the covalent or noncovalent attachment of certain polymers to the material. In one embodiment, materials comprising modifiable functional groups may be modified, by the covalent attachment of a multifunctional polymer. The modifiable functional groups in the materials are, for example, reactive groups capable of covalently reacting to attach the multifunctional polymer to the material. Exemplary modifiable functional groups include amine groups, hydroxyl groups, thiol groups, and carboxylic acid groups. The modifiable functional groups also can permit the modification by non-covalent attachment of certain polymers or monomers, for example, by hydrogen bonding interactions, hydrophobic interactions, or salt bridging.

Exemplary materials that can be modified as disclosed herein include carbohydrates, such as polysaccharides, and leather. Exemplary polysaccharides include dextran, cellulose or starch. Other exemplary materials include natural materials, such as wool or silk, as well as fibers of synthetic polymers such as polyamines and polyamides, e.g., nylon. Man made materials may be modified such as regenerated cellulose and viscose rayon, and regenerated proteins, and various cellulose derivatives. Other synthetic polymer materials also may be modified, such as polyesters, polyethers, polyacrylics and modified acrylics, polyurethanes and combinations thereof with other monomers and polymers.

In one embodiment, materials comprising amino acids, for example in the form of poly(amino acids), may be modified. For example, in one embodiment, wool and silk materials comprising proteins may be modified as disclosed herein.

Cellulosic Materials

In one embodiment, a variety of cellulose containing materials may be modified as disclosed herein. Exemplary materials include textile fabrics for clothing and apparel, paper materials, such as filters, and other materials such as chromatography materials. For example, cotton fibers or cloth comprising such fibers may be modified.

In one embodiment, cellulose containing materials, such as cotton, are modified, for example, by the attachment of a multifunctional polymer. The modification of cotton material can alter properties of the cotton, such as its water/soil repellent characteristics, or permanent press properties. Advantageously, the cotton containing materials may be modified after procedures such as dyeing of the cotton. The cotton material may be also provided as a blend with other natural and/or synthetic materials, either before or after the modification step wherein, for example, the hydrophobic groups are covalently attached.

Cellulose is a mostly linear polymer of glucose connected by β-1,4-linkages as shown below:

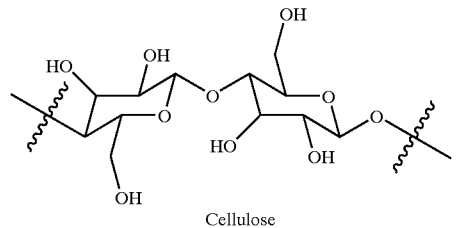

Cellulose

Each strand of natural cellulose is from 2000 to 3000 anhydro glucose units long. The cellulose polymers are easily hydrolyzed by acid. The cellulose molecules form fibrils in which the majority of the molecules are oriented in the direction of the fiber axis, giving the fiber its strength. Between the crystalline regions are semicrystalline and amorphous areas. The configuration of the fiber is stabilized by hydrogen bonds and van der Waals forces.

In cellulose, each glucose unit contains three hydroxyl groups which gives cellulose its hydrophilic characteristics. Using the methods disclosed herein, these hydroxyl groups may be chemically modified to alter its properties. For example, the hydroxyl groups may be modified by the attachment of multifunctional polymers comprising hydrophobic groups, such as hydrocarbon and fluorocarbon groups, to impart hydrophobic characteristics to the cellulose, and consequently, to materials, such as clothing made from the cotton.

Amino Acid Containing Materials

In one embodiment, materials comprising poly(amino acids), such as proteins, may be modified as disclosed herein. For example, wool materials may be modified. Wool materials, for example, may comprise a protein such as keratin, which may be modified as disclosed herein.

Materials comprising amino acids, for example comprising proteins, may be modified as disclosed herein, for example, by modification of substituents on the amino acid side chains. For example, the hydroxyl on serine, threonine, or tyrosine may be modified. The side chain on lysine, arginine and histidine may be modified. The carboxylic acid group on aspartate and glutamate may be modified. The amide group on asparagine and glutamine may be modified, as well as the thiol group on cysteine. Modification can occur, for example, by the covalent or non-covalent attachment of polymers that alter properties of the material as disclosed herein.

A variety of materials with modifiable functional groups, such as thiol, amine and hydroxyl, may be modified as disclosed herein. While, in one embodiment, the modification is described in detail herein with respect to cellulose by way of example, other materials including hydroxyl or other modifiable groups may be modified by the methods disclosed herein.

Multifunctional Molecules

Multifunctional molecules for use in modifying the surfaces of materials such as textile fibers, including cotton, wool and nylon, are provided. In one embodiment, multifunctional polymers are provided. The term "multifunctional polymer" as used herein, refers to polymers with plural functional groups or regions, such as binding groups, hydrophobic groups, and hydrophilic groups and oleophobic groups. The multifunctional polymers can include hydrophobic regions and/or hydrophilic regions. The multifunctional polymers also may include binding functional groups that permit either non-covalent or covalent binding to the material being treated, thus permitting the multifunctional polymer to form a non-covalent or covalent coating on the material. For example, the binding functional groups may be capable of associating with the surface via hydrogen bonds, van der Waals, ionic, and/or hydrophobic, or other non-covalent interactions between the coating molecule and the surface being coated. The binding groups also may be reactive groups that are capable of reacting with functional groups on the surface to form a covalent bond between the coating molecule and the surface.

Modification Using Activated Acyl Groups

A variety of hydrophobic groups may be attached to materials. In one embodiment, a material comprising a modifiable functional group, such as cellulose, is reacted with one or more activated acyl groups, for example, in the presence of a hindered base. While cellulose is discussed herein by way of example, other materials, including other polysaccharides, may be modified as disclosed herein, as well as materials containing amines.

For example, the activated acyl group may be an acid chloride or anhydride. Exemplary compounds are shown in Scheme I below. For example, the activated acyl group may be an acid chloride, RCOCl or anhydride, $(RCO)_2O$. Mixed anhydrides also may be used. The R group may be selected to determine the properties of the cellulose, after acylation. R in one embodiment is a cyclic or branched or straight chain hydrocarbon or fluorocarbon.

The activated acyl group may be an acyl chloride, RCOCl or anhydride $(RCO)_2O$, wherein R is a C5 to C20 saturated or unsaturated branched, cyclic or straight chain hydrocarbon, for example a straight chain C10–20 saturated hydrocarbon, such as hexadecanoyl chloride. For more hydrophobicity, longer chain lengths may be used.

In another embodiment, polymeric molecules, e.g., polyethylene acid chloride, maleic acid or polypropylene maleic acid chloride may be used. Exemplary polymeric activated acyl groups which can be used are shown in Formulas 1, 2 and 3 below, wherein m, n, o and p are independently about 10 to 10,000, preferably about 100–10,000. The molecules of Formulas 2 and 3 are multifunctional and can attach at multiple sites on the cellulose, and can form "loops" and "trains" respectively on the cellulose.

In another embodiment the activated acyl group may be an acid chloride, $R(CH_2)_2COCl$ or anhydride, $(R(CH_2)_2CO)_2O$, wherein R is a C1–C12 branched, cyclic or straight chain fluorocarbon. For example, R may be $CF_3-$. In another embodiment, R can be $CF_3(CF_2)_n-$ wherein n is, for example, 0 to 10 (as shown in Formula 4 in Scheme I below). Fluorinated chains are generally more hydrophobic than hydrocarbon chains of the same length, so shorter chains may be used. For example, cellulose may be rendered hydrophobic by reaction with the activated hydrophobic acyl group, $CF_3(CF_2)_2(CH_2)_2COCl$. Mixtures of hydrocarbons and fluorocarbons can be used.

Exemplary acid chlorides or anhydrides which may be used to treat a material, such as cellulose or other carbohydrate material, in the presence of a hindered base are shown in Scheme I below.

Scheme I

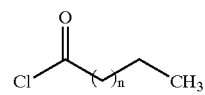

Formula 1

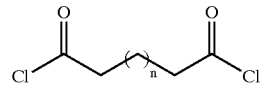

Formula 2

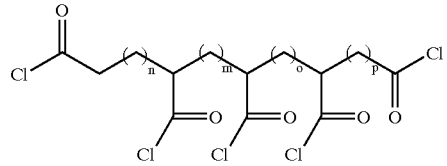

Formula 3

Hexadecanoyl chloride

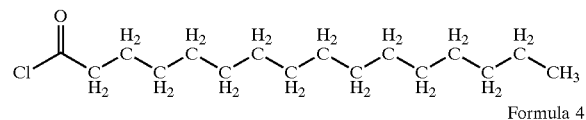

Formula 4

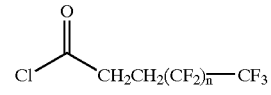

Acetyl chloride

Multifunctional Polymers Including Hydrophobic Groups and Hydrophilic Groups for Coating Hydrophilic Surfaces Non-Covalently In one embodiment multifunctional polymers are provided that include hydrophobic groups and hydrophilic groups. These multifunctional polymers may be used, for example, to form hydrophobic water repellent coatings non-covalently on surfaces, such as hydrophilic surfaces of materials, such as cellulose materials, including cotton. This permits the synthesis of durable water resistant coatings on materials, such as cotton, without the need for covalent chemical reactions. Durable non-covalent coatings may be formed via a large number of weak interactions, i.e., hydrogen bonds, van der Waals, ionic, and hydrophobic interactions, between the coating molecule and the surface being coated.

The multifunctional polymers may include hydrophilic functional groups that are capable of interacting with the hydrophilic surface, for example, of cotton fabric, as well as hydrophobic functional groups capable of repelling water. Exemplary polymers including both types of functional groups include graft copolymers and block copolymers containing hydrophilic and hydrophobic regions. Weber et al, Eds. *Solvents and Self Organization of Polymers*, Kluwer Academic, Domdrecht, The Netherlands, 1996.

For example, a graft copolymer, in one embodiment, includes a main polymer backbone consisting of one polymerized monomer with a second monomer type grafted and polymerized onto the backbone. The synthesis of a graft copolymer in one embodiment involves the formation of a reactive center on the polymer backbone molecule in the presence of a polymerizable monomer. Most methods of synthesizing graft copolymers involve the use of radical and ionic polymerization. In a preferred embodiment, a graft copolymer is provided that consists of a hydrophilic backbone with hydrophobic polymer grafts. The graft copolymer is applied to the materials, such as cotton fabric (a hydrophilic surface) to produce a durable hydrophilic coating.

Once adsorbed to the hydrophilic surface, the polymer will minimize its energy by orienting its hydrophilic backbone towards the hydrophilic cotton surface (noncovalent binding) with the alkyl groups (the hydrophobic grafts) oriented away from the surface (water/soil repellency). Thus, a durable, noncovalently attached water repellent coating is formed. If fluorinated hydrophobic monomers are used, an oil repellent finish is also produced. Examples of hydrophilic and hydrophobic monomers are listed in Table I, below. Many of these monomers are commercially available, for example from Polysciences, Inc., Warrington, Pa.

TABLE I

Hydrophobic Monomers

N-(tert-Butyl)acrylamide
n-Decyl acrylamide
n-Decyl methacrylate
N-Dodecylmethacrylamide
2-Ethylhexyl acrylate
1-Hexadecyl methacrylate
n-Myristyl acrylate
N-(n-Octadecyl) acylamide
n-Octadecyltriethoxysilane
N-tert-Octacrylate
Stearyl acrylate
Stearyl methacrylate
Vinyl laurate
Vinyl stearate Hydrophobic Monomers - Fluorinated 1H,1H,7H-Dodecafluoroheptyl methacrylate
2-Fluorostyrene
4-Fluorostyrene
1H,1H,2H,2H-Heptadecafluorodecyl acrylate
1H,1H,2H,2H-Heptadecafluorodecyl methacrylate
1H,1H-Heptafluorobutyl methacrylate
1H,1H-Heptafluorobutyl acrylate
1H,1H,4H-Hexafluorobutyl acrylate
1H,1H,4H-Hexafluorobutyl methacrylate
Hexafluoro-iso-propyl acrylate
Methacryloyl fluoride
1H,1H-Pentadecafluorooctyl acrylate
1H,1H-Pentadecafluorooctyl methacrylate
Pentafluorophenyl acrylate
Pentafluorophenyl methacrylate
2,3,4,5,6-Pentafluorostyrene
1H,1H,3H-Tetrafluoropropyl acrylate
1H,1H,3H-Tetrafluoropropyl methacrylate
2,2,2-Trifluoroethyl acrylate
2,2,2-Trifluoroethyl methacrylate Hydrophilic Monomers Acrylamide
Acrylic acid
N-Acryloyltris(hydroxymethyl)methylamine
Bisacrylamidoacetic acid
Glycerol mono(meth)acrylate
4-Hydroxybutyl methacrylate
2-Hydroxyethyl acrylate
2-Hydroxyethyl methacrylate (glycol methacrylate)
N-(2-Hydroxypropyl)methacrylamide
N-Methacryloyltris(hydroxymethyl)methylamine
N-Methylmethacrylamide
Poly(ethylene glycol)(n)monomethacrylate
Poly(ethylene glycol)(n)monomethyl ether monomethacrylate
2-Sulfoethyl methacrylate
1,1,1-Trimethylolpropane monoallyl ether
N-Vinyl-2-pyrrolidone (1-vinyl-2-pyrrolidone)

Other hydrophobic monomers include perfluoroalkyl monofunctional vinyl ethers, such as those available from Allied Signal (Morristown, N.J.) and perfluoroalkyl sulfonamide acrylates and methacrylates (3M, St. Paul, Minn.).

The multifunctional polymers also may comprise natural polymers. Carbohydrates, such as dextran, starch, and cellulose, are natural, hydrophilic polymers composed of hydroxyl group-containing glucose units.

Using the methods disclosed herein, in one embodiment, hydrophobic/oleophobic groups, such as palmitoyl chloride, may be grafted onto some of the hydroxyl groups, for example, one per anhydroglucose unit, to produce a carbohydrate with groups capable of hydrogen bonding (hydroxyl groups) and groups capable of repelling water/soil (e.g., palmityl groups)—an amphiphilic polymer. Additionally, the free hydroxyl groups can be replaced with groups capable of forming stronger hydrogen bonds to the cotton surface, such as carboxylates, amines, and sulfonates, and therefore produce a more durable coating. For example, free hydroxyl groups can be converted to carboxylates with reagents such as chloroacetic acid or succinic anhydride, converted to amines by caprolactam, or converted to sulfonates with sulfuryl chloride. Other reactions include reaction of hydroxyl groups on carbohydrates to add hydrophobicity, by, for example: the addition of alkyl halides or alkyl epoxides; activation with chloroacetic acid followed by reaction with a nucleophilic alkyl, such as an alkyl amine, alkyl alcohol, or alkyl thiol, in the presence of a catalyst, such as dicyclohexylcarbodiimide (DCC); activation with carbonyl diimidazole followed by reaction with a nucleophilic alkyl; reaction with acetyl chlorides, such as palmitoyl chloride or with alkyl anhydrides; activation with oxidizing agents to produce a dialdehyde floowed by reaction with an alkyl amine or hydrazide; and activation with epichlorohydrin followed by reaction with a nucleophilic alkyl.

Block copolymers also may be used, wherein the block copolymer includes two polymers, and wherein blocks of one type of homopolymer are attached to blocks of another type of homopolymer. By alternating sequences of hydrophobic blocks with hydrophilic blocks, a block copolymer with amphiphilic character is formed. The copolymer can be adsorbed to the hydrophilic surface of materials such as wool and cotton. Once adsorbed, the polymer will take the form of loops on the surface with the hydrophilic polymer adsorbed to the surface and the hydrophobic blocks oriented away from the surface as loops to impart a durable and hydrophobic finish. Examples of hydrophobic and hydrophilic monomers that may be used are listed in Table I. R. J. Ceresa, Eds., *Block and Graft Copolymerization*, John Wiley and Sons, New York, 1973.

Hydrophobic monomers may be grafted to hydrophilic polymers by polymerizing the hydrophobic monomers to reactive groups, such as end groups, on hydrophilic polymers. The monomers also may be reacted in succession to produce block copolymers. Hydrophobic polymer chains may be grown on an activated hydrophilic polymer. For example, poly(2-hydroxyethyl methacrylate) and acryloyl chloride may be reacted to form an acrylate-activated moiety. This acrylate moiety may be reacted with stearyl acrylate to produce a graft-(stearylacrylate)2-hydroxyethyl-methacrylate.

The multifunctional polymers may be used to coat a variety of materials as disclosed herein including cotton as well as natural or synthetic poly(amides). In one embodiment, materials comprising amino acids, such as a wool material, comprising a protein such as keratin, may be modified. A multifunctional polymer comprising a poly(amino acid) modified to contain hydrophobic groups may be used to coat materials such as a protein containing material. The hydrophobically modified poly(amino acid) is applied to the material to which it associates via hydrogen bonding interactions between the poly(amino acid) portion of the hydrophobically modified poly(amino acid) and the poly(amino acid) in the material, such as wool. FIG. 1 shows one embodiment wherein a material comprising surface poly(amino acids) 10 is bound by hydrogen bonding interactions with the hydrophobically modified poly(amino acid) 40 that includes a poly(amino acid) chain 20 and covalently attached hydrophobic chains 30. The hydrophobic chains may be, for example, hydrocarbon or fluorocarbon chains, and may be, for example, straight, branched, or cyclic.

The hydrophobic groups, such as linear, branched, or cyclic hydro or fluorocarbon groups, may be conveniently attached to poly(amino acids), for example by coupling to the amine group of lysine. Amines of lysines may react with isothiocyanates, isocyanates, acylazides, N-hydroxysuccinimide esters, sulfonylchloroaldehydes and glyoxals, epoxides and oxiranes, carbonates, arylating reagents, imidoesters, carbodiimides, anhyrides and acid chlorides, as described, for example, in G. T. Hermanson, "Bioconjugate Techniques", Academic Press, San Diego, Calif., 1996, pp. 137–146.

Multifunctional Polymers Including Hydrophobic Groups and Hydrophilic Groups for Coating Hydrophobic Surfaces Non-Covalently The multifunctional polymers, conversely, also may be used to form hydrophilic coatings non-covalently on hydrophobic surfaces of materials. The non-covalent coatings thus may be used to give the materials more comfortable wear properties, and enhance durability. Non-covalent hydrophilic coatings may be formed on a variety of hydrophobic materials, such as materials comprising polyesters, or polyamides including nylon. Other examples of materials include polyolefins, acrylates, polyacrylics and polyurethanes.

The non-covalent coatings can form on the surface via weak interactions, such as, hydrogen bonds, van der Waals, ionic, and hydrophobic interactions, between the coating molecule(s) and the surface. Typically the multifunctional polymers include hydrophilic groups and hydrophobic functional groups that are capable of interacting with the hydrophobic surface, for example, of a polyamide such as nylon. Exemplary polymers including hydrophobic groups and hydrophilic groups are described in detail above. For example, graft copolymers, as discussed above, may be used.

Once adsorbed to the hydrophobic surface, the polymer will minimize its energy by orienting its hydrophobic portion(s) towards the hydrophobic surface, by non-covalent binding, and with the hydrophilic portion(s) oriented away from the surface. Thus, a durable, non-covalently attached hydrophilic coating is formed. Examples of hydrophilic and hydrophobic monomers are listed in Table I, above. Many of these monomers are commercially available, for example from Polysciences, Inc., Warrington, Pa.

In one embodiment, block copolymers also may be used that include hydrophobic blocks and hydrophilic blocks. The copolymer can be adsorbed to the hydrophobic surface of materials such as nylon. Once adsorbed, the polymer will take the form of loops on the surface with the hydrophobic polymer adsorbed to the surface and the hydrophilic blocks oriented away from the surface as loops to impart a durable and hydrophilic finish. Examples of hydrophobic and hydrophilic monomers that may be used are listed in Table I. R. J. Ceresa, Eds., *Block and Graft Copolymerization*, John Wiley and Sons, New York, 1973.

The multifunctional polymer used to form the non-covalent coating may comprise, for example, a hydrophobically modified poly(amino acid) that is applied to the material to which it associates via bonding interactions between the hydrophobic portion of the hydrophobically modified poly(amino acid) and the hydrophobic surface. The hydrophobic chains may be, for example, hydrocarbon or fluorocarbon chains, and may be, for example, straight, branched, or cyclic.

Comb or graft copolymers may be used. In one embodiment, a graft copolymer may be used that includes a synthetic backbone, e.g., a polyester, polypropylene, polyethylene or polypropylene/polyethylene copolymer, to which are grafted hydrophilic portions, such as silk-like polypeptides or polysaccharide moieties such as dextran or cellulose chains or branches. The resulting polymer can be used to coat materials such as polyesters or polypropylene to give them more comfortable wear properties and enhance durability. Other materials include polyamides, polyurethanes and polyolefins.

Multifunctional Polymers Including Reactive Groups for Covalent Attachment to Surfaces Multifunctional molecules, such as multifunctional polymers, also are provided that include one or more reactive groups and optionally hydrophobic and/or hydrophilic groups. Certain hydrophilic groups, such as carboxyl groups, may also function as reactive groups. The multifunctional polymers including reactive groups may be covalently attached to the surface of materials, such as wool or cotton, to modify properties of the material, for example, to impart wrinkle resistance and permanent press properties to the materials.

In one embodiment, the multifunctional polymers are block copolymers or graft copolymers including reactive groups, for example, cellulose (hydroxyl) or amino acid reactive functional groups at one or both ends of the polymer, or spaced along the polymer backbone. Exemplary monomers and polymers including reactive groups are shown in Table II below. Exemplary reactive functional groups and their reactions with carbohydrates also are described in G. T. Hermanson, *Bioconjugate Techniques*, Academic Press, San Diego, Calif., 1996, pp. 27–40, the disclosure of which is incorporated herein. In one embodiment, carbohydrate (cellulose) reactive monomers are reacted with carbohydrate (cellulose) unreactive monomers, for example as listed in Table I, to produce a multifunctional polymer that is a copolymer with the desired density of crosslinking sites on the copolymer. The multifunctional polymer also may be a cellulose reactive polymer as shown below. The multifunctional polymers may be used to covalently coat a variety of materials, including cotton, as well as materials containing amino acids and proteins, such as wool.

The attached multifunctional polymers can, for example, impart wrinkle resistance by crosslinking the cellulose chains of cotton to prevent slippage and to increase the crystallinity of the cotton through attractive interactions (van der Waals) between the polymer chains grafted on the fabric. The loss in tear strength due to rigidification that results in commercial crosslinking processes is avoided due to the spring-like nature of the polymer chains which allow stretching without loss of cellulose conformation. The polymer also can mask the properties of the fabric, thus providing useful surface characteristics such as water resistance and soil repellency.

The multifunctional polymer may comprise a hydrophobic region and a reactive group; a hydrophilic region and a reactive group; or combinations thereof. For example, the polymer may include plural different hydrophilic or plural different hydrophobic regions and one or more reactive groups, or may include combinations of hydrophobic and hydrophilic regions in addition to one or more reactive groups. The multifunctional polymer in one embodiment is a hydrophilic polymer comprising a plurality of reactive groups. For example, the amylose fraction of starch has a helical conformation (A. L. Lehninger, *Biochemistry*, Worth, N.Y., 1970, p. 229) and may be used to form spring-like crosslinks. Similarly, polymers such as peptides, including natural or synthetic polymers, with a flexible secondary structure can be used.

A list of exemplary cellulose reactive monomers and polymers is provided below in Table II. These monomers and polymers are also useful with a variety of other materials, such as wool.

TABLE II

Cellulose Reactive Monomers

Beta-Ketoester 2-(Acetoacetoxy)ethyl methacrylate
Activated Ester

N-Acroyloxysuccinimide
Aldehyde

Acrolein
Carboxylic Acid Anhydrides

Acrylic anhydride
Allylsuccinic anhydride
Citraconic anhydride
4,4'-Hexafluoro-iso-propylidenebisphthalic anhydride
Methacrylic anhydride
4-Methacryloxyethyl trimellitic anhydride
Carboxylic Acid Chloride Acryloyl chloride
Methacryloyl chloride
Carboxylic Acid Hydrazide Adipic acid dihydrazide
Oxiranes Allyl glycidyl ether
Glycidyl acrylate
Glycidyl methacrylate
Isocyanate Alpha, alpha-dimethyl-3-isopropenylenzyl isocyanate
Methylolamides N-Methylolacrylamide
N-Methylolmethacrylamide Cellulose Reactive Polymers Aldehyde and Ketone-Functional Polymers Polyacetal
Polyacrolein
Poly(methyl isopropenyl ketone)
Poly(vinyl methyl ketone)
Poly(ethylene glycol)-aldehyde terminated
Carbonylimidazole Activated Polymers Poly(ethylene glycol)-carbonyldiimidazole terminated
Carboxylic Acid Anhydride-Functional Polymers Poly(acrylic anhydride)
Poly(alkalene oxide/maleic anhydride) copolymers
Poly(azelaic anhydride)
Poly(butadiene/maleic anhydride) copolymer
Poly(ethylene/maleic anhydride) copolymer

TABLE II-continued

Poly(maleic anhydride)
Poly(maleic anhydride/1-octadecene) copolymer
Poly(vinyl methyl ether/maleic anhydride) copolymer
Poly(styrene/maleic anhydride) copolymer
Carboxylic Acid Chloride-Functional Polymers Poly(acrylolyl chloride)
Poly(methacryloyl chloride)
Chlorinated Polymers Polydimethylsiloxane-chlorine terminated
Polyethylene-chlorinated
Polyisoprene-chlorinated
Polypropylene-chlorinated
Poly(vinyl chloride)
Epoxy-Terminated Polymers Poly(ethylene glycol)-epoxide terminated
Isocyanate-Terminated Polymers Poly(ethylene glycol)-isocyanate terminated
Oxirane Functional Polymers Poly(glycidyl methacrylate)
Hydrazide-Functional Polymers Poly(acrylic hydrazide/methyl acrylate) copolymer
Succinimidyl Ester Polymers Poly(ethylene glycol)-succinimidyl ester terminated
Tresylate-Activated Polymers Poly(ethylene glycol)-tresylate terminated
Vinyl Sulfone-Terminated Polymers Poly(ethylene glycol)-vinyl sulfone terminated Examples of the use of Multifunctional Polymers for Non-Covalent and Covalent Attachment to a Material to Impart Selected Properties to the Material A variety of multifunctional polymers may be non-covalent or covalently attached to a material to impart a selected property to the material. In one embodiment, the multifunctional polymer is a polymer comprising a plurality of reactive groups, such as a poly(carboxylic acid) molecule or poly(anhydride) molecule. The polymer may be formed, for example, from a polyanhydride, such as poly(maleic anhydride), or from polymerization of monomers such as maleic anhydride, or monomers from Table II.

In one embodiment, a method of modifying a material is provided, the method comprising attaching a multifunctional polymer to the material, wherein the multifunctional polymer is capable of non-covalently or covalently binding the material, and wherein the multifunctional polymer is a modified poly(maleic anhydride) polymer. As used herein, the term "modified poly(maleic anhydride) polymer" refers to a polymer of maleic anhydride that has been modified covalently, for example, to include hydrophobic groups, or oleophobic groups. Modified poly(maleic anhydride) polymers include copolymers, including block and graft copolymers, of maleic anhydride. The multifunctional polymer may be attached to the material covalently via a reaction between functional groups on the polymer and the material, or noncovalently via noncovalent interactions between the polymer and the material.

The modified poly(maleic anhydride) polymer may comprise a poly(maleic anhydride) polymer partially modified by the covalent attachment of a hydrophobic molecule. In one embodiment, the modified poly(maleic anhydride) polymer comprises anhydride groups, and the polymer is attached to the material via the formation of ester or amide bonds between the anhydride groups of the polymer and hydroxyl or amine groups on the material.

The modified poly(maleic anhydride) polymer may be formed by the reaction of a poly(maleic anhydride) polymer comprising carboxy or anhydride groups with a hydrophobic molecule comprising a hydroxyl or amine group, thereby to attach the hydrophobic molecule to the poly(maleic anhydride) polymer via an ester or amide bond. The hydrophobic molecule may, for example, have the formula R-X, where R is a C8–24 hydrocarbon or fluorocarbon, and X is OH, $NH_2$ or SH.

One embodiment of a molecule that may be attached to poly(maleic anhydride) polymers is a compound of Formula V, shown below:

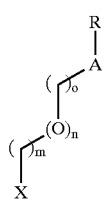

Formula V

In the compound of Formula V, for example:
m is 0 or 1;
n is 0 or 1;
o is 0 to 2;
A is —$SO_2$—, —CONH—, —$CH_2$— or $CF_2$—;
R is a linear, branched, or cyclic hydrocarbon or fluorocarbon, including fully or partially fluorinated hydrocarbons, wherein R may be, for example, a $C_1$ to $C_{30}$ hydrocarbon or fluorocarbon; and
X is a nucleophilic group capable of reacting with an anhydride, such as hydroxyl, amine or thiol.

In one embodiment, the modified poly(maleic anhydride) is a copolymer of maleic anhydride and a polymerizable molecule. For example, maleic anhydride may be copolymerized with a compound of Formula VI, below:

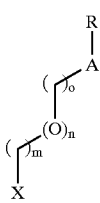

Formula VI

In the compound of Formula VI, for example:
m is 0 or 1;
n is 0 or 1;
o is 0 to 2;
A is —$SO_2$—, —CONH—, —$CH_2$— or $CF_2$—;
R is a linear, branched, or cyclic hydrocarbon or fluorocarbon, including fully or partially fluorinated hydrocarbons, wherein R may be, for example, a $C_1$ to $C_{30}$ hydrocarbon or fluorocarbon; and
X is a polymerizable group capable of copolymerizing with maleic anhydride, for example, vinyl, acrylate, methacrylate, styrenyl, alkene, glycidyl acrylate, glycidyl methacrylate, vinyl ether (allyl), acrylamide, or methacrylamide.

In one example, the modified poly(maleic anhydride) polymer is a copolymer of maleic anhydride and a molecule R-X, wherein R is a C1–C30, for example, a $C_8$–$C_{24}$ hydrocarbon or fluorocarbon, and X is polymerizable moiety, such as an unsaturated group, for example, an alkene.

In one embodiment, the modified poly(maleic anhydride) may be a copolymer of maleic anhydride and an alkene comprising a hydrophobic group, such as a hydroalkylalkene or a fluoroalkyl alkene. The modified poly(maleic anhydride) polymer may be formed by copolymerization of maleic anhydride and an alkene comprising a hydrophobic group, followed by hydrolysis of anhydrides on the resulting polymer to form free carboxyl groups on the modified polymer. In another embodiment, the modified poly(maleic anhydride) polymer is a poly(maleic anhydride) polymer comprising covalently attached polyamide groups, such as nylon groups. In another embodiment, the modified poly(maleic anhydride) polymer comprises a poly(maleic anhydride) polymer comprising covalently attached polysaccharide groups, such as dextran, starch or cellulose groups.

Chemically modified poly(maleic anhydrides), such as poly(carboxylic acid) polymers, may be used in one embodiment to impart selected properties, such as water, oil, grease, or soil repellency, wrinkle resistance, smoothness and other permanent press properties, increased strength, and/or abrasion resistance, and to improve comfort of materials such as cotton and wool, or to impart a natural, cotton-like feel to materials such as nylon or other synthetic fibers, e.g., polyesters, and to wool or silk. The polymer may be attached to the materials, for example, via the formation of ester bonds to materials such as cotton, or, e.g., the formation of amide bonds to materials such as wool, silk and nylon. In another embodiment, a poly(carboxylic acid) polymer formed for example from poly(maleic anhydride) may be attached non-covalently to materials such as cotton, wool, silk and nylon via weak physical attraction, for example via hydrogen bonding, between the carboxylic acids of the multifunctional polymer to groups on surfaces of materials such as cotton, wool, silk and nylon. Poly(maleic anhydride) based polymers are advantageous due to the ease of reaction and the low cost of poly(maleic anhydride).

Use of a Poly(Carboxylic Acid) to form a Water or Soil Repellent Polymer Coating A multifunctional polymer, such as a poly(carboxylic acid) may be used, for example, to form a water or soil repellent finish or coating on fibers or fabric of materials such as cotton and wool. The multifunctional polymer may be attached to the material through covalent bonds, such as ester or amide bonds after reformation of the anhydride with sodium hypophosphite, or physically through many weak forces, such as hydrogen bonds, or electrostatic interactions.

In one embodiment, the multifunctional polymer comprises a poly(carboxylic acid) to which are attached hydrophobic groups, such as hydroalkyls or fluoroalkyls. The poly(carboxylic acid) may be formed from poly(maleic anhydride) modified with hydrocarbon and/or fluorocarbon hydrophobic moieties.

Figure 2:
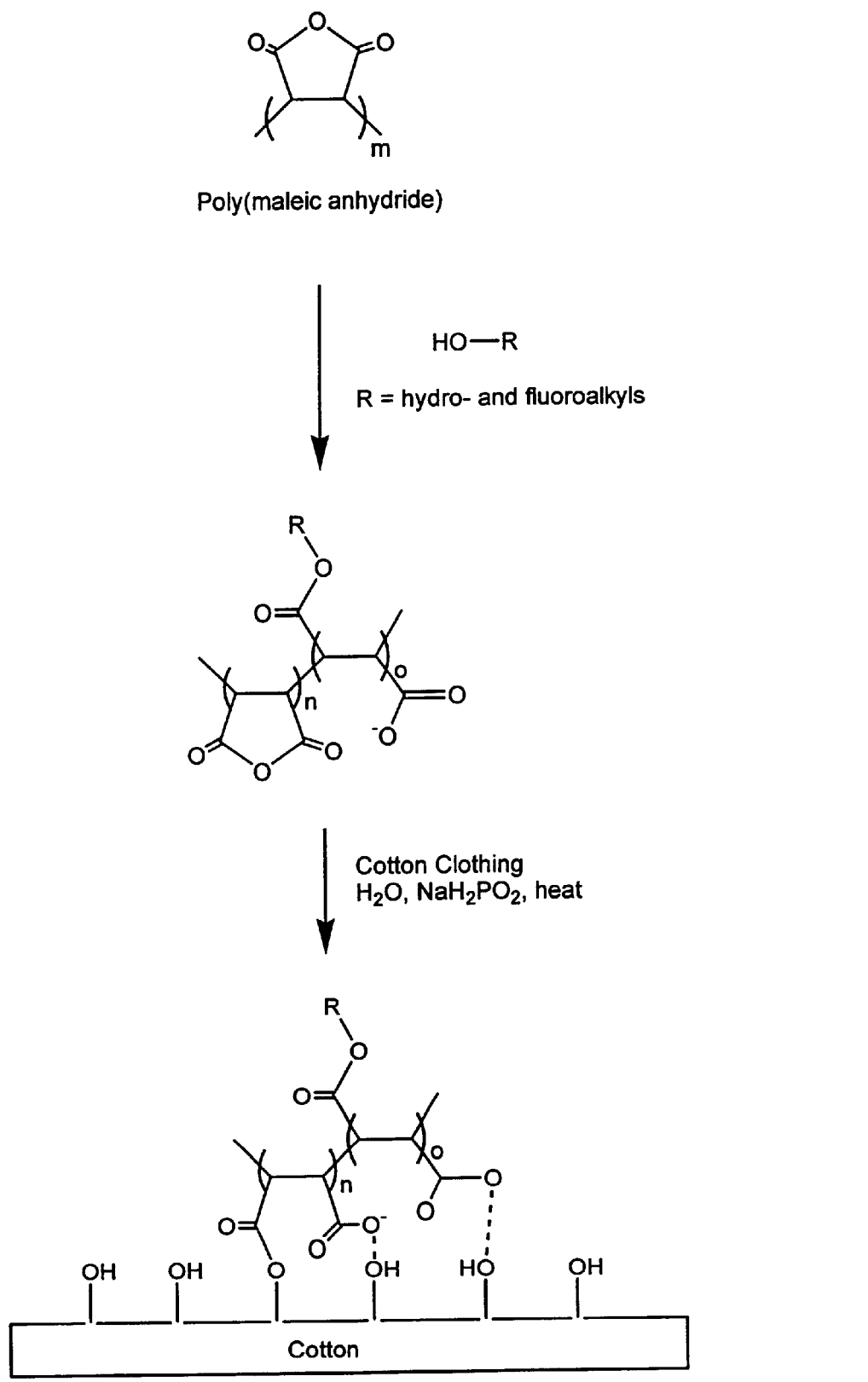
FIG. 2 is a scheme showing the covalent attachment of hydro and/or fluoro alkyl groups to a poly(maleic anhydride) polymer followed by covalent attachment of the polymer to a cotton surface.

One embodiment is shown in FIG. 2. In FIG. 2, m, n and o are, for example, independently about 1 to 10,000, e.g., about 1 to 1000. For example, m is about 1 to 1000, and n and o are about 1 to 800. The ratio of o:n is, for example, about 1:1 to 25:1, for example about 10:1. Poly(maleic anhydride) is partially reacted with hydro- and fluoroalkanols, or, for example, compounds of Formula V, above, to form a polymer containing both textile reactive (maleic anhydride) and hydro/oleophobic groups (hydro- and fluoroesters). This compound is then covalently bound to a material such as cotton yarn or fabric using suitable reaction conditions, such as an aqueous solution containing the polymer and a sodium hypophosphite catalyst. These reaction conditions are described for example in: Welch, *Rev. Prog. Coloration*, Vol. 22, 1992, pp. 32–41; and Lammermann, *Melliand English*, Vol. 3, 1992, pp. E105–E107, the disclosures of which are incorporated herein by reference. In the Figures, the total number of m, n and o subunits can be arranged in any order in the polymer.

Figure 3:
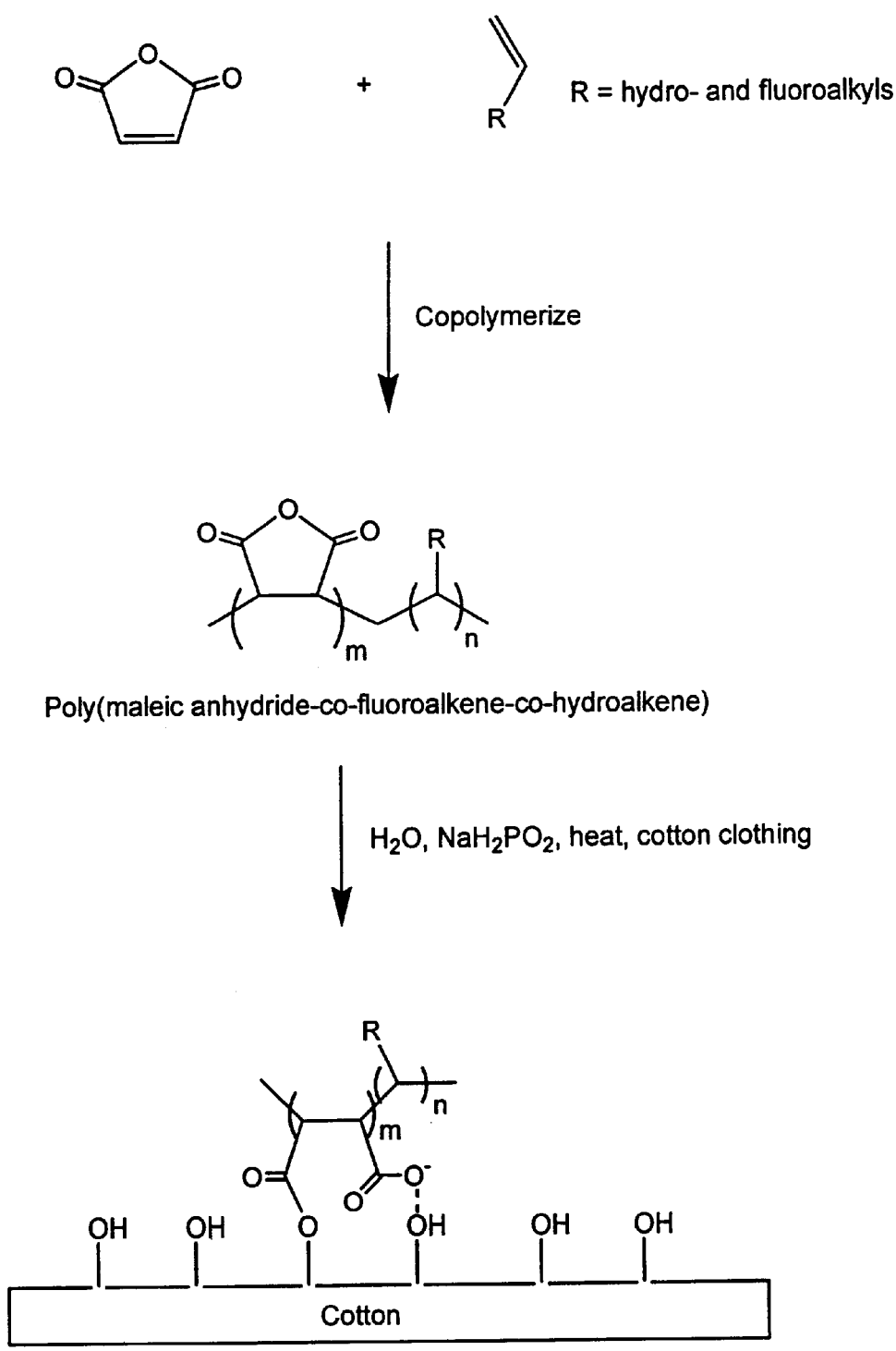
FIG. 3 is a scheme showing the copolymerization of maleic anhydride and hydro and/or fluoro vinyl alkyls to form a copolymer followed by covalent attachment of the copolymer to a cotton surface.

In another embodiment, a copolymer is formed from maleic anhydride and hydro- and fluoroalkenes, or compounds of Formula VI above, as shown in FIG. 3. In FIG. 3, m and n are, for example, independently about 1 to 10,000, e.g., about 1 to 1000, and the n:m ratio is for example, about 1:1 to 25:1, e.g., about 10:1. The copolymerized polymer can have, for example, about 1 to 1000 of the maleic anhydride-co-fluoroalkene-co-hydroalkene units. The resulting polymer, poly(maleic anhydride-co-fluoroalkene-co-hydroalkene), is covalently bound to cotton fiber or fabric under the conditions described above for the method shown in FIG. 2.

Figure 6:
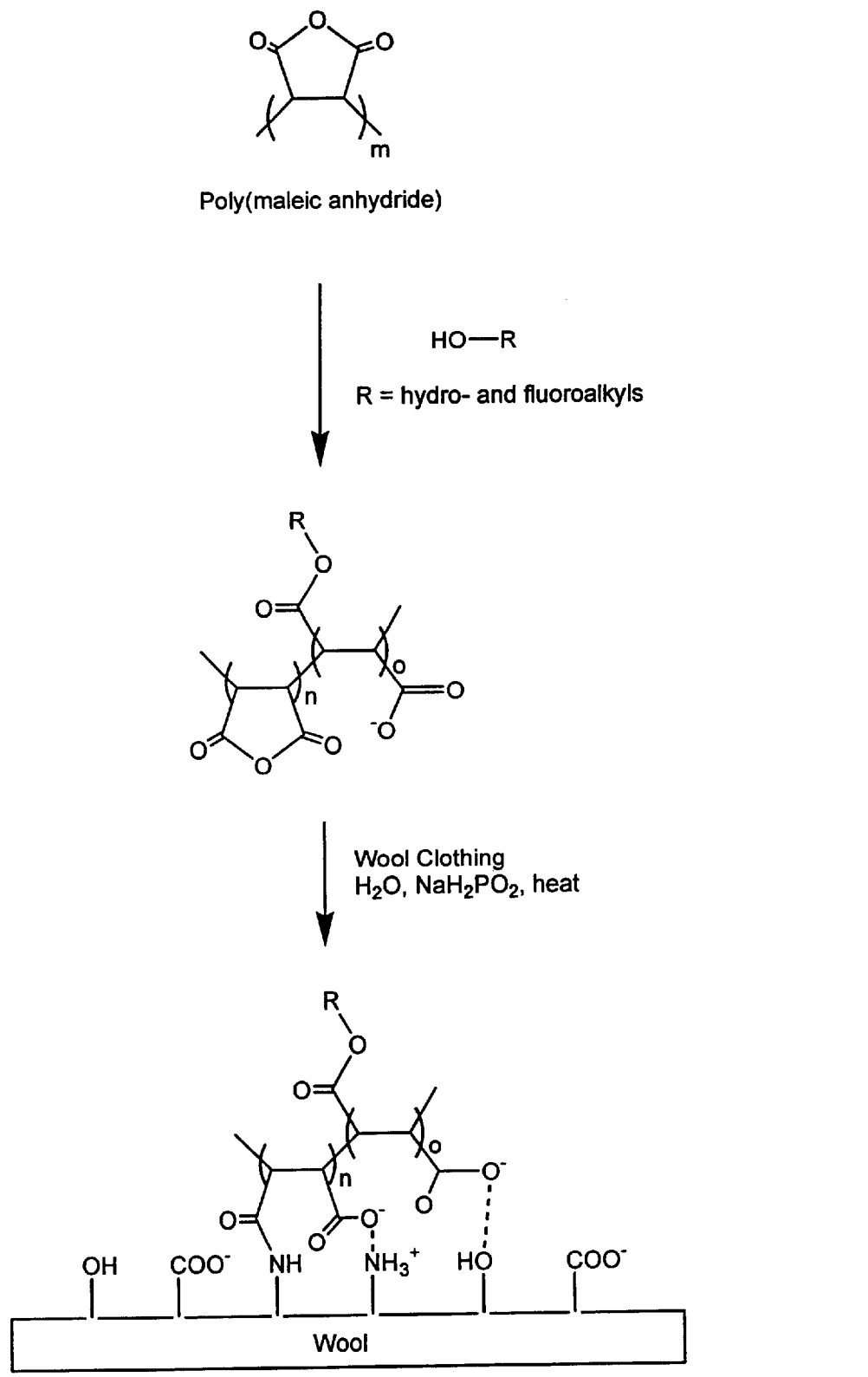
FIG. 6 is a scheme showing the covalent attachment of hydro and/or fluoro vinyl alkyl groups to a poly(maleic anhydride) polymer followed by covalent attachment of the polymer to a wool surface.
Figure 7:
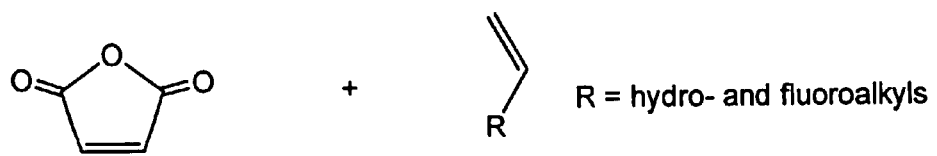
FIG. 7 is a scheme showing the copolymerization of maleic anhydride and hydro and/or fluoro vinyl alkyls to form a copolymer followed by covalent attachment of the copolymer to a wool surface.
Figure 7:
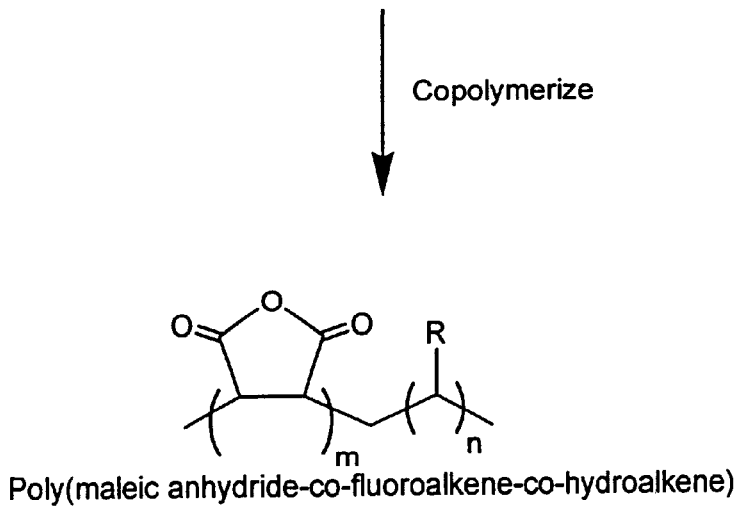
Figure 7:
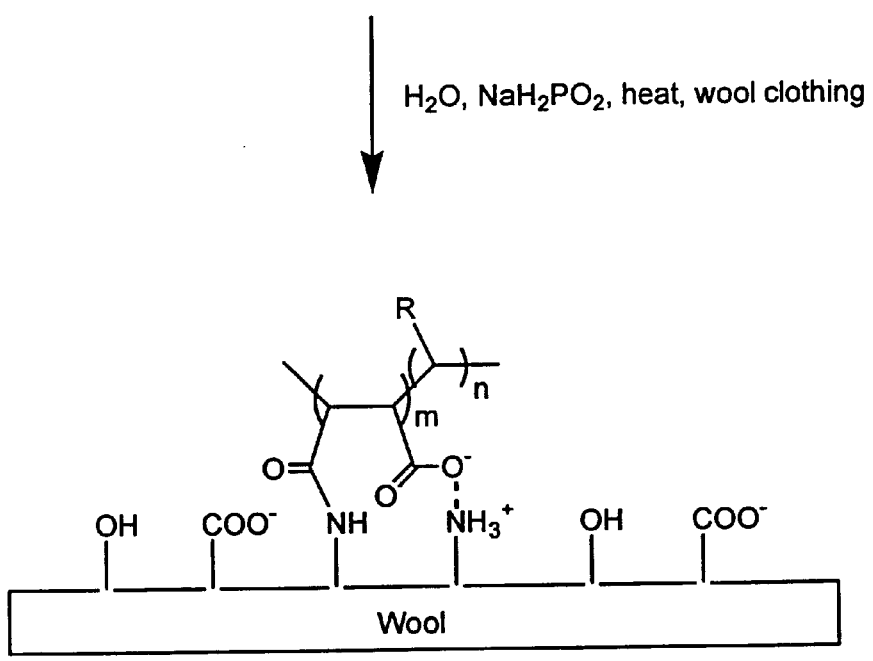

Since wool also contains functional groups, such as serine hydroxyls and lysine amines, capable of reacting with maleic anhydride, the above polymers may be covalently bound in a similar fashion to impart water/soil repellency to wool fibers and fabric, as shown in FIGS. 6 and 7. In FIGS. 6 and 7, m, n and o are for example independently about 1 to 10,000, or e.g., about 1 to 1000. Thus the number of units n and o in the alkylated polymer can be for example independently about 1 to 1000. In one embodiment, m is about 1 to 1000, n is about 1 to 800 and o is about 1 to 800. The ratio of o:n is, for example, about 1:1 to 25:1, e.g., about 10:1.

Figure 4:
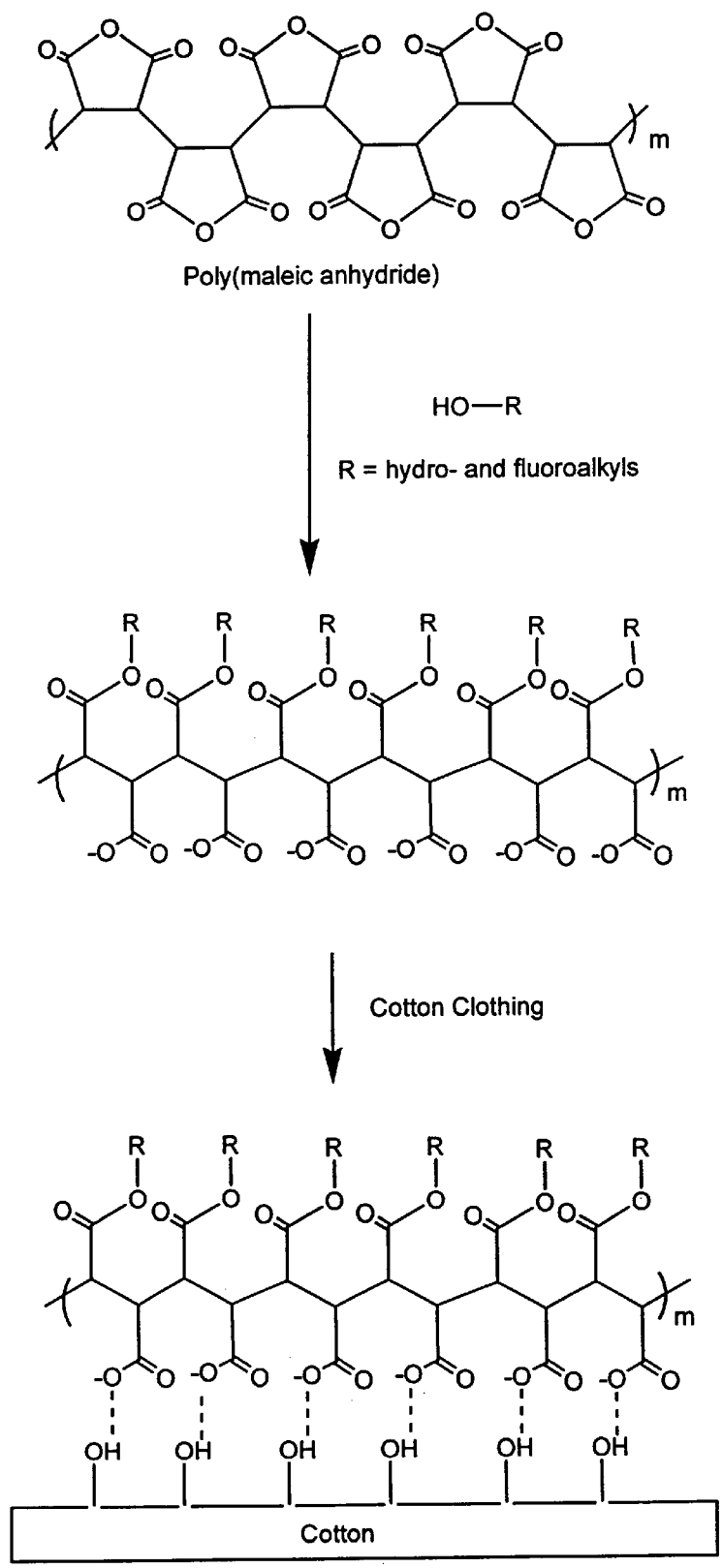
FIG. 4 is a scheme showing the covalent attachment of hydro and/or fluoro alkyl groups to a poly(maleic anhydride) polymer followed by non-covalent attachment of the polymer to a cotton surface.

To produce a water/soil repellent, non-covalently bound coating on materials such as cotton, hydrogen bonds are formed between the multifunctional polymer coating and the material. In the embodiment shown in FIG. 4, poly(maleic anhydride) is reacted, for example, completely, with hydro- and fluoroalkanols, for example, as described above, to form an amphiphilic multifunctional polymer containing both carboxylic acids, capable of hydrogen bonding to cotton, and hydro/oleophobic groups for water/soil repellency. The compound is then applied to cotton fibers or clothing from an aqueous solution where the carboxylates hydrogen bond to the cotton hydroxyls. No catalyst is needed. In FIG. 4, m is for example about 1 to 10,000, or e.g., about 1 to 1000.

Figure 5:
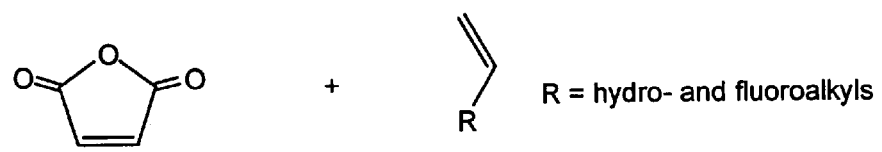
FIG. 5 is a scheme showing the copolymerization of maleic anhydride and hydro and/or fluoro vinyl alkyls to form a copolymer followed by non-covalent attachment of the copolymer to a cotton surface.
Figure 5:
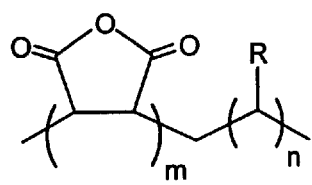
Figure 5:
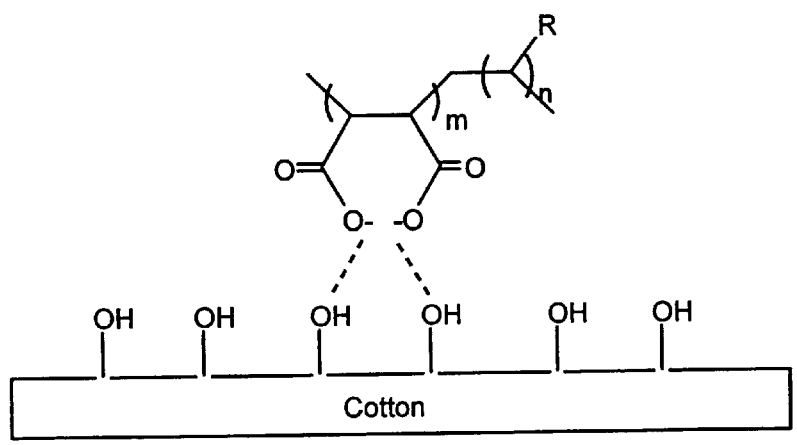

In another embodiment, maleic anhydride and hydro- and fluoroalkenes, as described above, are copolymerized. The resulting polymer, poly(maleic anhydride-co-fluoroalkene-co-hydroalkene), is hydrolyzed in water to give carboxylates which subsequently hydrogen bond to cotton hydroxyls. This method is illustrated in FIG. 5. In FIG. 5, m and n are, for example, independently about 1 to 10,000, e.g., about 1 to 1000. The ratio of n:m is, for example, about 1:1 to 25:1, e.g., about 10:1. The copolymerized polymer can have, for example, about 1 to 1000 of the maleic anhydride-co-fluoroalkene-co-hydroalkene units.

Figure 8:
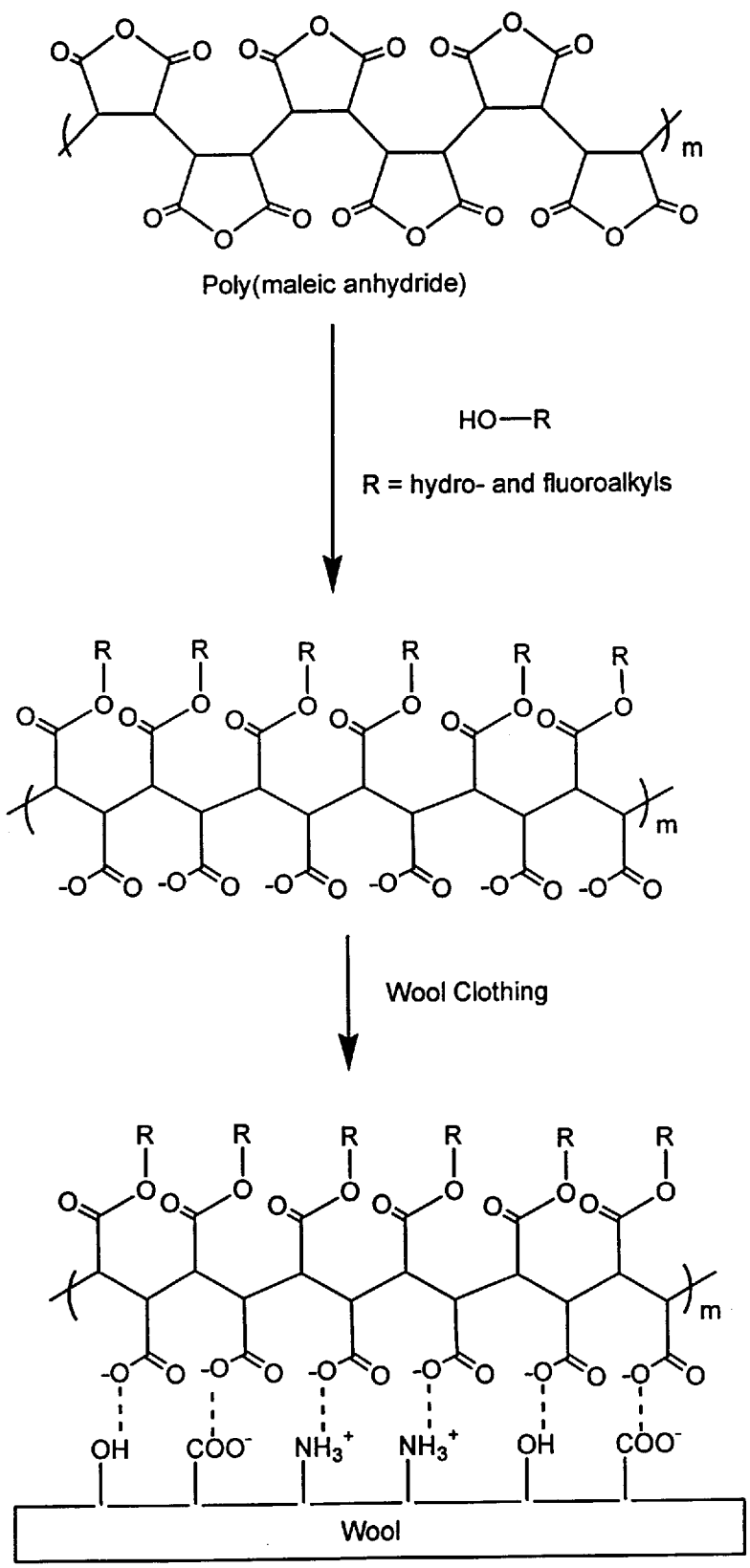
FIG. 8 is a scheme showing the covalent attachment of hydro and/or fluoro vinyl alkyl groups to a poly(maleic anhydride) polymer followed by non-covalent attachment of the polymer to a wool surface.
Figure 9:
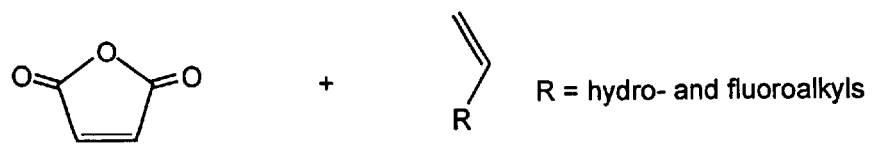
FIG. 9 is a scheme showing the copolymerization of maleic anhydride and hydro and/or fluoro vinyl alkyls to form a copolymer followed by non-covalent attachment of the copolymer to a wool surface.
Figure 9:
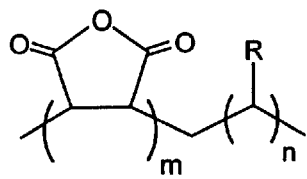
Figure 9:
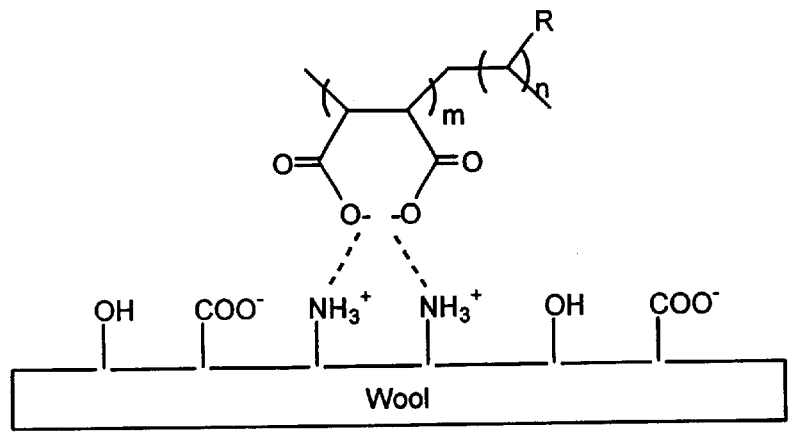

Since wool also contains functional groups, such as serine hydroxyls, and lysine amines, capable of forming hydrogen bonds to carboxylates, the above polymers may be applied in a similar manner to impart water/soil repellency to wool fibers and fabric, as shown in FIGS. 8 and 9. In FIG. 8, m is for example about 1 to 10,000, or e.g., about 1 to 1000. In FIG. 9, m and n are, for example, independently about 1 to 10,000, e.g., about 1 to 1000, and the n:m ratio is for example, about 1:1 to 25:1, e.g., about 10:1. The copolymerized polymer can have, for example, about 1 to 10,000, or, e.g., about 1 to 1000 of the maleic anhydride-co-fluoroalkene-co-hydroalkene units.

Use of a Poly(Carboxylic Acid) to form a Permanent Press Coating

In one embodiment, to crosslink cotton to produce a permanent press finish, a multifunctional polymer is provided that includes a plurality of carboxylic groups and one or more crystallizable moieties. The multifunctional polymer can be formed, for example, by attaching crystallizable groups to a poly(maleic anhydride) backbone. The maleic anhydride can be covalently linked to the material or hydrolyzed to form a dicarboxylic acid which can hydrogen bond to the material. The crystallizable moiety, e.g., polymers of hydrocarbons, provide the stiff scaffolding on the surface of the fabric, similar to common starch/ironing treatments, to maintain durable press characteristics. Unlike the starch treatment, the coating is covalently or non-covalently bound to the material and insoluble in water.

Figure 10:
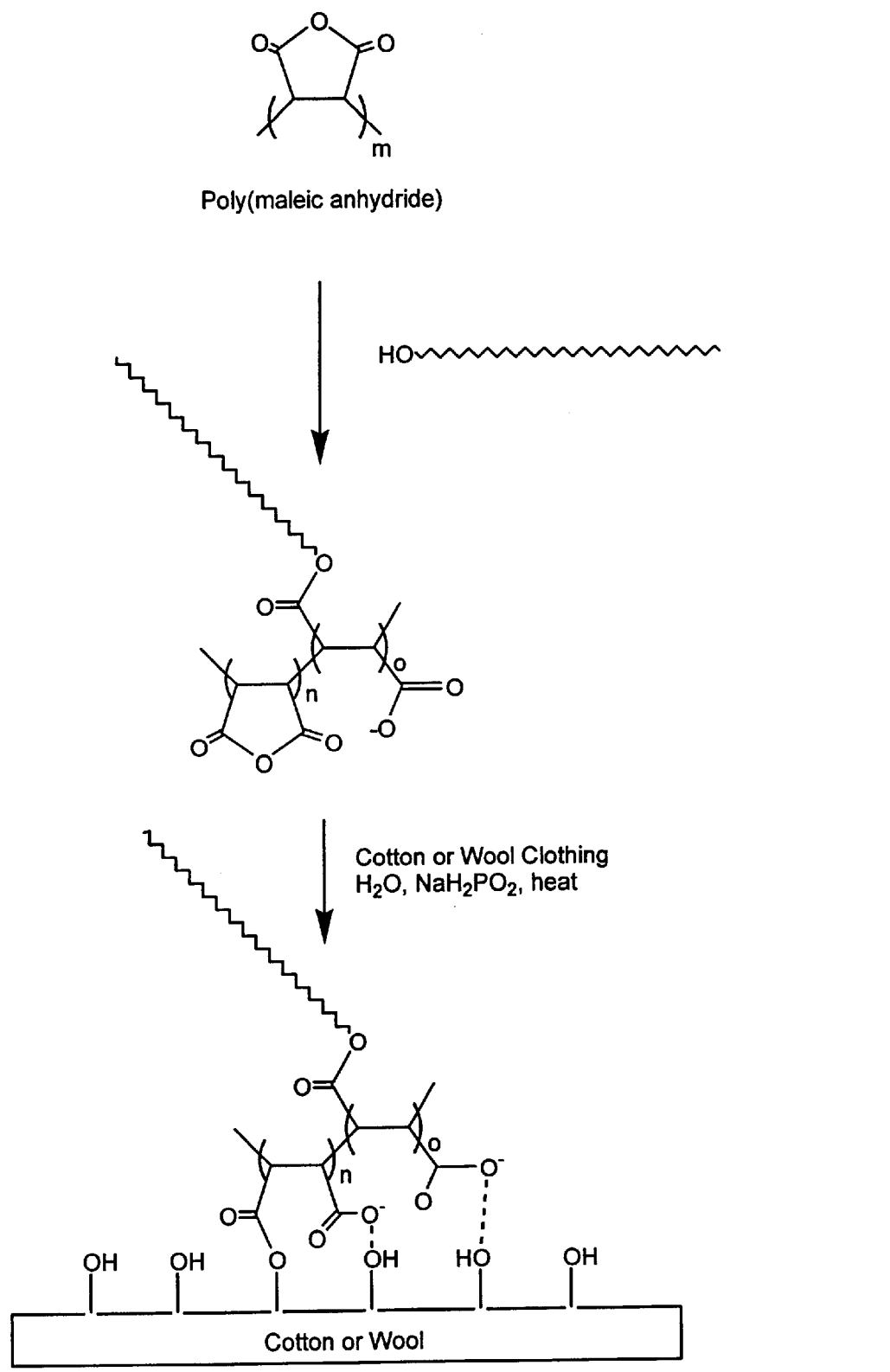
FIG. 10 is a scheme showing the grafting of a crystallizable moiety, such as a hydrocarbon polymer, to a poly (maleic anhydride) polymer followed by covalent attachment of the polymer to a cotton or wool surface.

In one embodiment, to produce a durable press, covalently-bound finish on cotton, the cotton-binding moiety (maleic anhydride) is combined with a crystallizable moiety (polymers of hydrocarbons). This may be accomplished, for example, as shown in FIG. 10. Poly (maleic anhydride) is partially reacted with poly (hydroalkanols) to form a polymer containing both cotton reactive (maleic anhydride) and crystallizable groups (poly (hydroalkylesters)). This compound is then covalently bound to the cotton yarn or fabric using reaction conditions similar to the formation of durable press cotton with poly (carboxylic acids) (an aqueous solution containing the polymer and sodium hypophosphite catalyst). In FIG. 10, m, n and o are, for example, independently about 1 to 10,000, e.g., about 1 to 1000. For example, m is about 1 to 1000, and n and o are about 1 to 800. The ratio of n:o can be, for example, about 1:50 to 1:0.02, e.g., 1:1. In the alkylated polymer, for example, there can be for example independently about 1 to 10,000, or, e.g., about 1 to 1000 of the n and o subunits.

Figure 11:
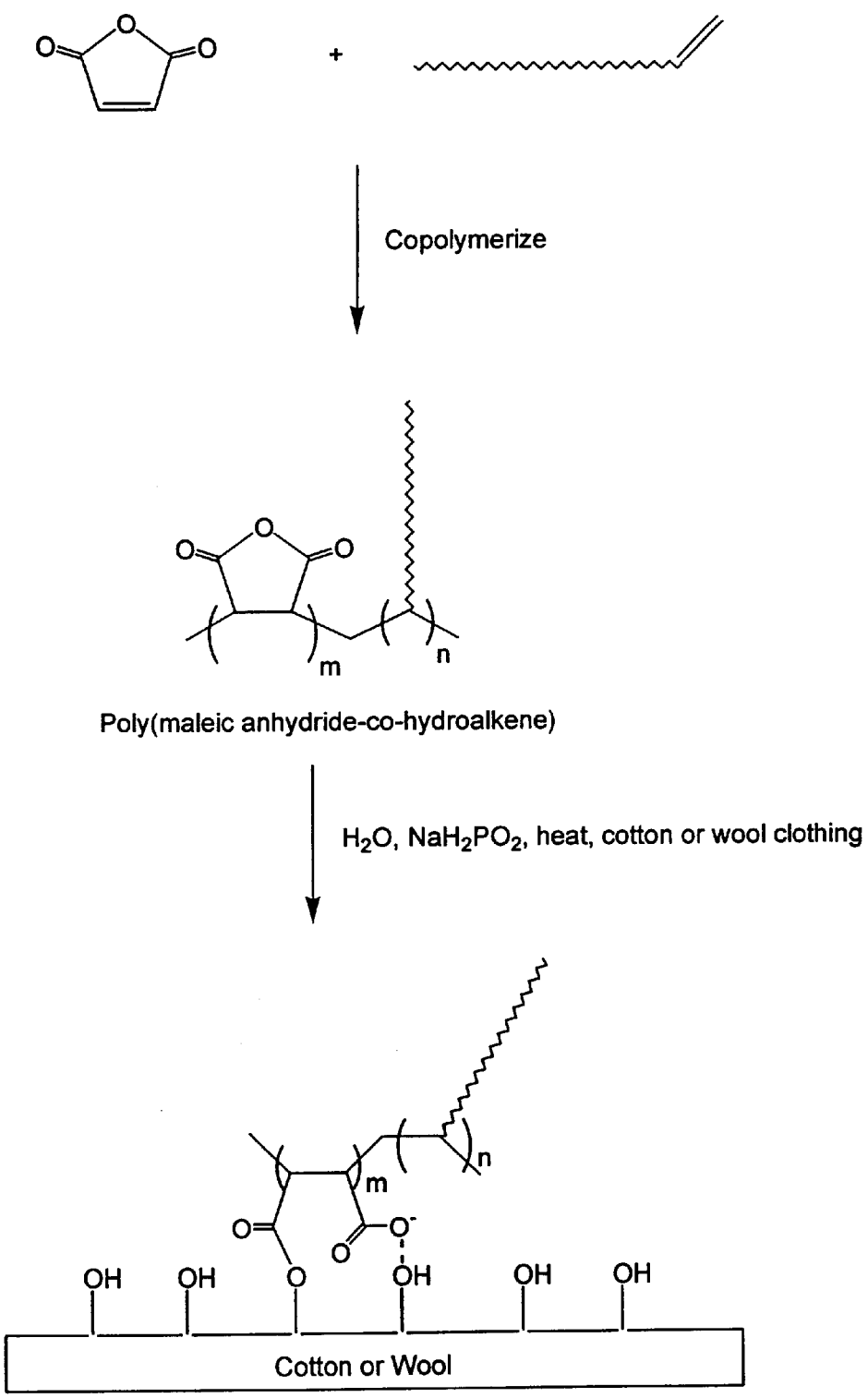
FIG. 11 is a scheme showing the copolymerization of maleic anhydride and a polymerizable compound comprising a crystallizable moiety to form a copolymer followed by covalent attachment of the copolymer to a cotton or wool surface.

Another embodiment is shown in FIG. 11, wherein a copolymer is formed from maleic anhydride and poly (hydroalkenes). The resulting polymer, poly(maleic anhydride-co-polyhydroalkene), is covalently bound to cotton fiber or fabric under identical conditions to the first method presented above. In FIG. 11, m and n are, for example, independently about 1 to 10,000, e.g., about 1 to 1000, and the n:m ratio is for example, about 1:50 to 1:0.02, e.g., 1:1. The copolymerized polymer can have, for example, about 1 to 1000 of the maleic anhydride-co-fluoroalkenex-co-hydroalkene units.

Since wool also contains functional groups (serine hydroxyls, lysine amines, etc) capable of reacting with maleic anhydride, the above polymers may be applied in a similar fashion to impart durable press properties to wool fiber yarns and/or fabric.

Figure 12:
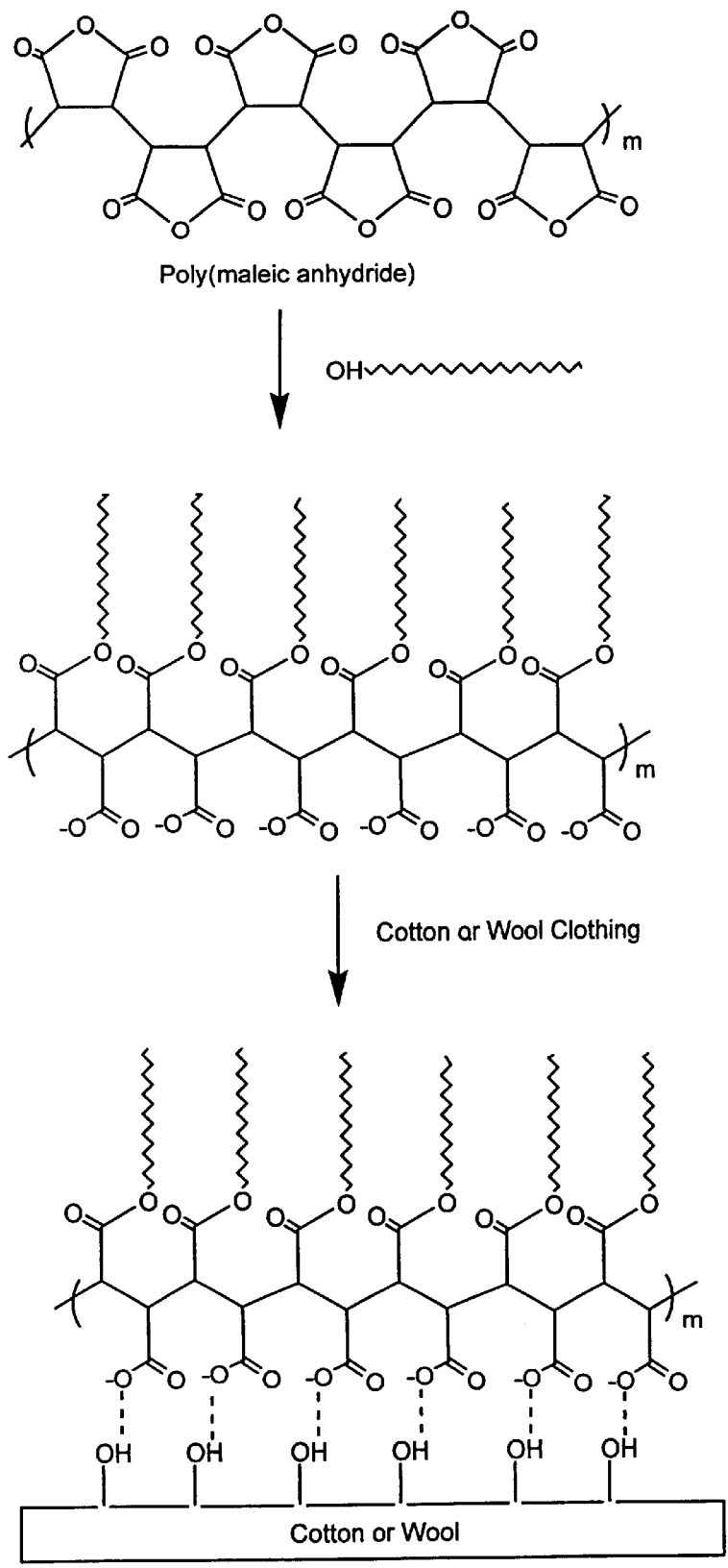
FIG. 12 is a scheme showing the grafting of a crystallizable moiety, such as a hydrocarbon polymer, to a poly (maleic anhydride) polymer followed by non-covalent attachment of the polymer to a cotton or wool surface.

To produce a durable press, non-covalently bound finish on textiles, in one embodiment, hydrogen bonds are formed between the multifunctional polymer and the cotton. In one embodiment, shown in FIG. 12, poly(maleic anhydride) is reacted, for example, completely, with poly(hydroalkanols), as described above, to form an amphiphilic polymer containing both carboxylic acids (capable of hydrogen bonding to textiles) and crystallizable groups for durable press properties. The compound is then applied to cotton fibers, yarn, apparel fabric or clothing from an aqueous solution where the carboxylates hydrogen bond to the cotton hydroxyls. No catalyst is needed. In FIG. 12, m is, for example about 1 to 10,000, or e.g., about 1 to 1000.

Figure 13:
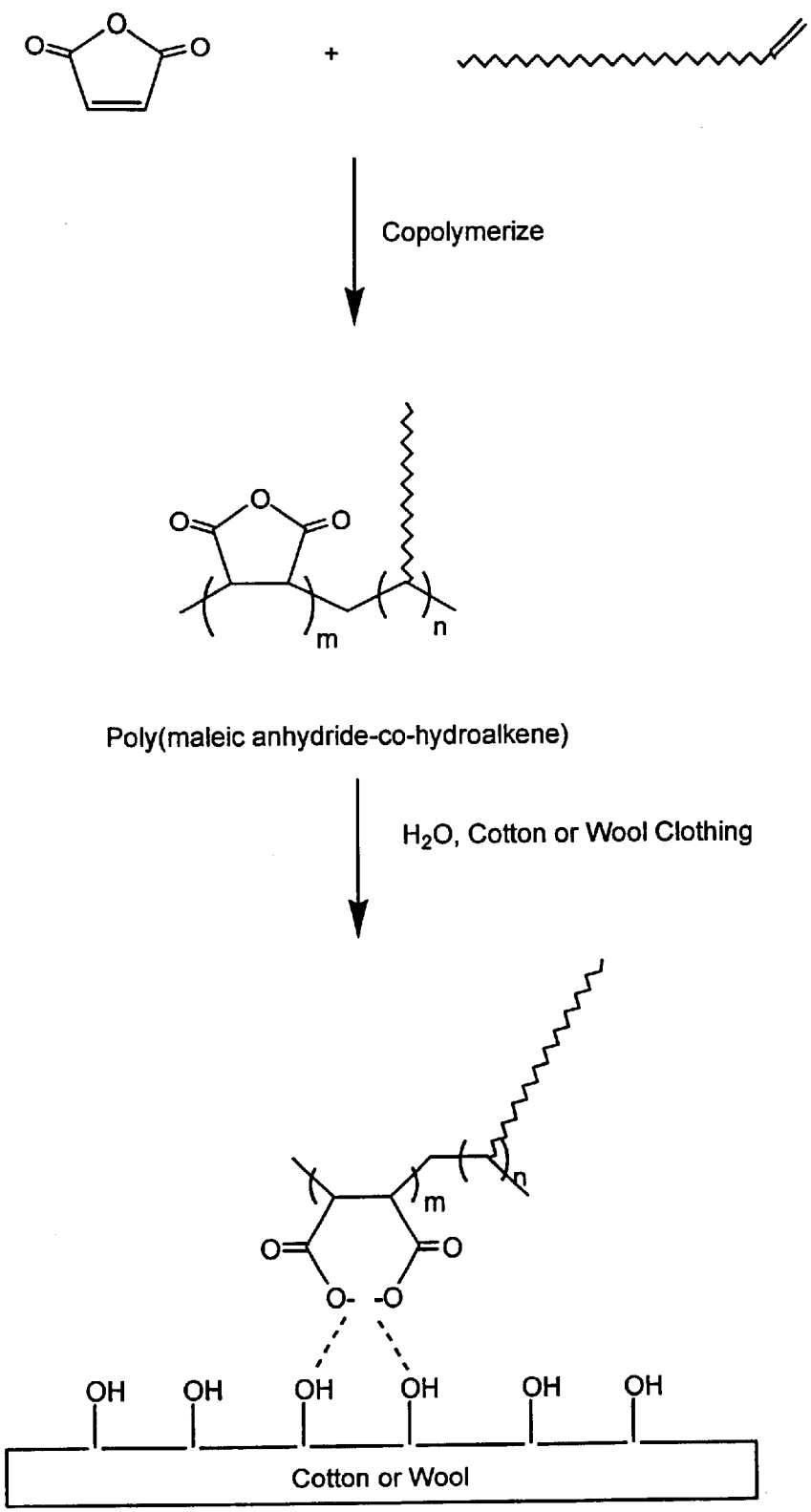
FIG. 13 is a scheme showing the copolymerization of maleic anhydride and a polymerizable compound comprising a crystallizable moiety to form a copolymer followed by non-covalent attachment of the copolymer to a cotton or wool surface.

In another embodiment, shown in FIG. 13, maleic anhydride and poly(hydroalkenes) as described above are copolymerized. The resulting polymer, poly(maleic anhydride-co-polyhydroalkene), is hydrolyzed in water to give carboxylates which subsequently hydrogen bond to cotton hydroxyls. In FIG. 13, m and n are, for example, independently about 1 to 10,000, e.g., about 1 to 1000, and the n:m ratio is for example about 1:50 to 1:0.02, e.g., 1:1. The copolymerized polymer can have, for example, about 1 to 1000 of the maleic anhydride-co-fluoroalkene-co-hydroalkene units.

Since wool also contains functional groups (serine hydroxyls, lysine amines, etc) capable of forming hydrogen bonds to carboxylates, the above polymers may be applied in a similar fashion to impart durable press properties to wool fibers and fabric.

Use of a Poly(Carboxylic Acid) to Form an Abrasion Resistant Coating

Compared to synthetic fabrics such as polyester and nylon, cotton and wool have relatively low abrasion resistance. However, synthetic fabrics are not as comfortable to wear as cotton or wool. Therefore, combining the best attributes of each fabric type would be beneficial. To improve the abrasion resistance of cotton and wool, in one embodiment, a multifunctional polymer comprising a highly abrasion resistant molecule, such as nylon, is used to coat the surface of the fabric.

Figure 14:
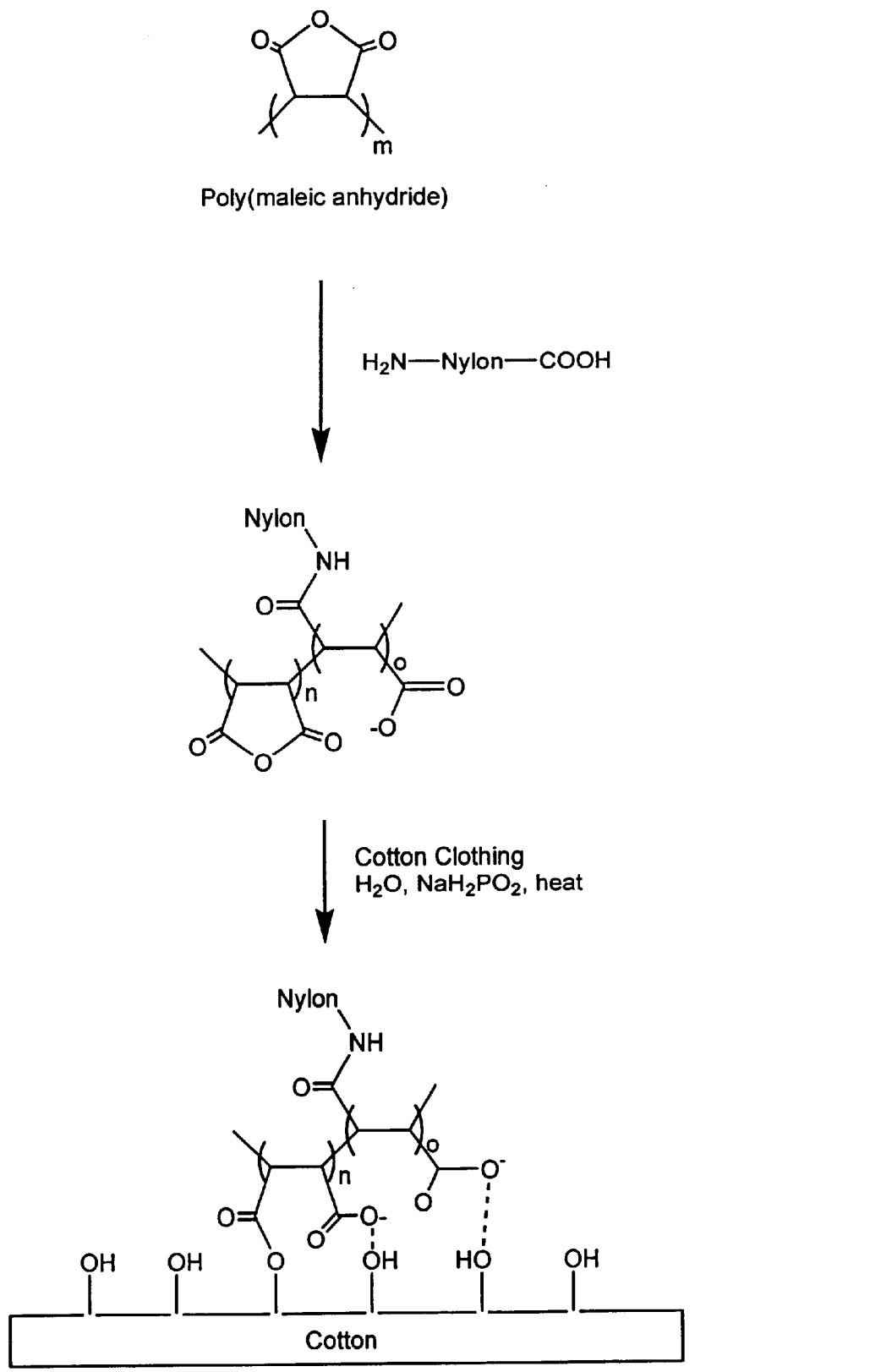
FIG. 14 is a scheme showing the reaction of a poly(maleic anhydride) polymer with the amine ends of nylon followed by the covalent attachment of the polymer to a cotton surface.

To produce an abrasion resistant, covalently-bound finish on cotton, in one embodiment, poly(maleic anhydride) is partially reacted with the amines of nylon to form a polymer containing both cotton reactive (maleic anhydride) and abrasion resistant groups (nylon), as shown in FIG. 14. This multifunctional polymer then is covalently bound to the cotton yarn or fabric using reaction conditions similar to the formation of durable press cotton with poly(carboxylic acids) (an aqueous solution containing the polymer and sodium hypophosphite catalyst). In FIG. 14, m, n and o are, for example, independently about 1 to 10,000, e.g., about 1 to 1000. For example, m is about 1 to 1000, and n and o are about 1 to 800. In the nylon treated polymer, for example, there can be for example independently about 1 to 10,000, or, e.g., about 1 to 1000 of the n and o subunits. The ratio of n:o is, for example, about 1:50 to 50:1, e.g., 1:1.

Figure 16:
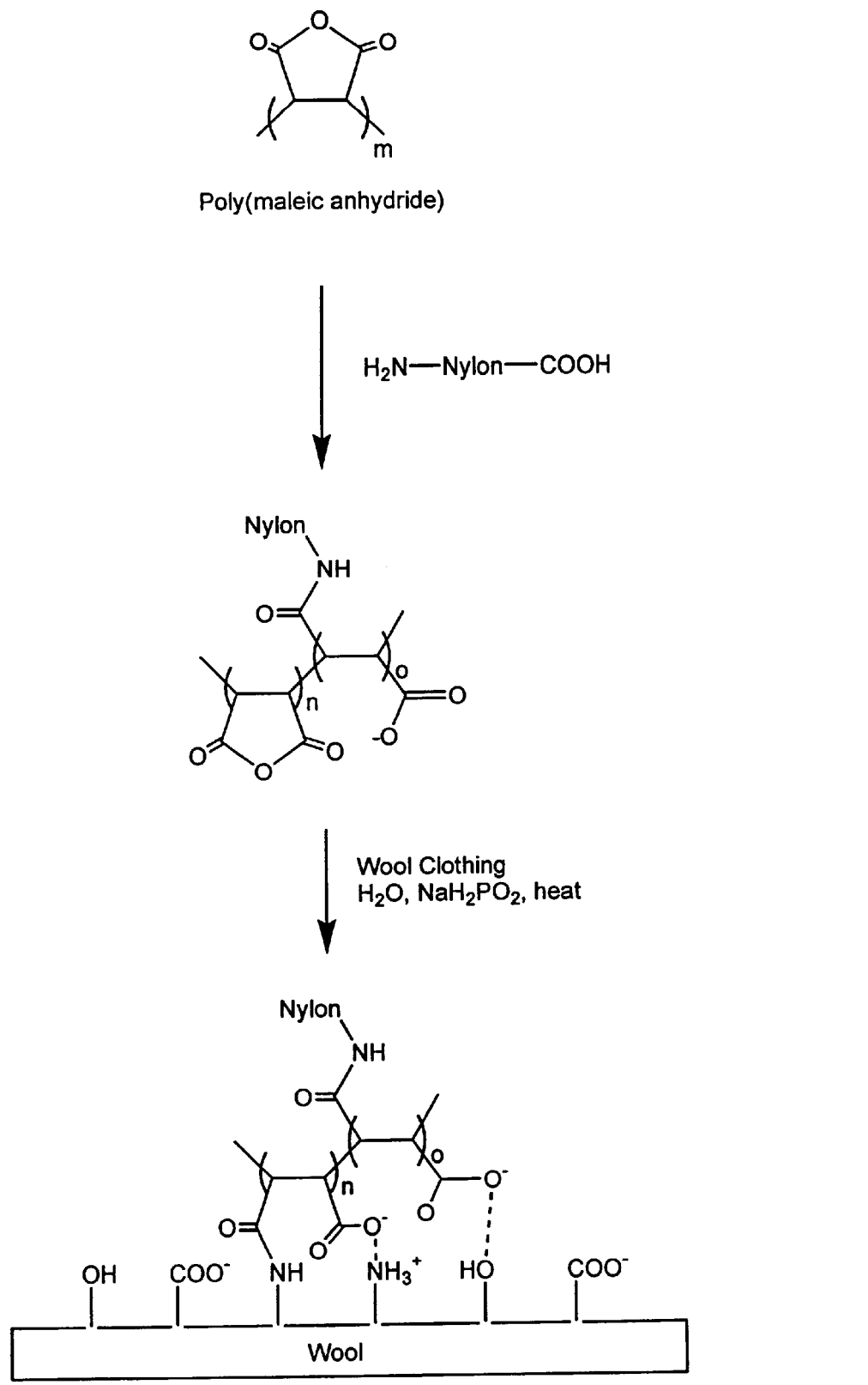
FIG. 16 is a scheme showing the reaction of a poly(maleic anhydride) polymer with the amine ends of nylon followed by the covalent attachment of the polymer to a wool surface.

Since wool also contains functional groups, such as serine hydroxyls, and lysine amines, capable of reacting with maleic anhydride, the above polymers may be covalently bound in a similar fashion to impart abrasion resistant properties to wool fibers and fabric, as shown in FIG. 16. In FIG. 16, m, n and o are, for example, independently about 1 to 10,000, e.g., about 1 to 1000. For example, m is about 1 to 1000, and n and o are about 1 to 800. In the nylon treated polymer, for example, there can be for example independently about 1 to 10,000, or, e.g., about 1 to 1000 of the n and o subunits. The ration of n:o is, for example, about 1:50 to 50:1, e.g., 1:1.

Figure 15:
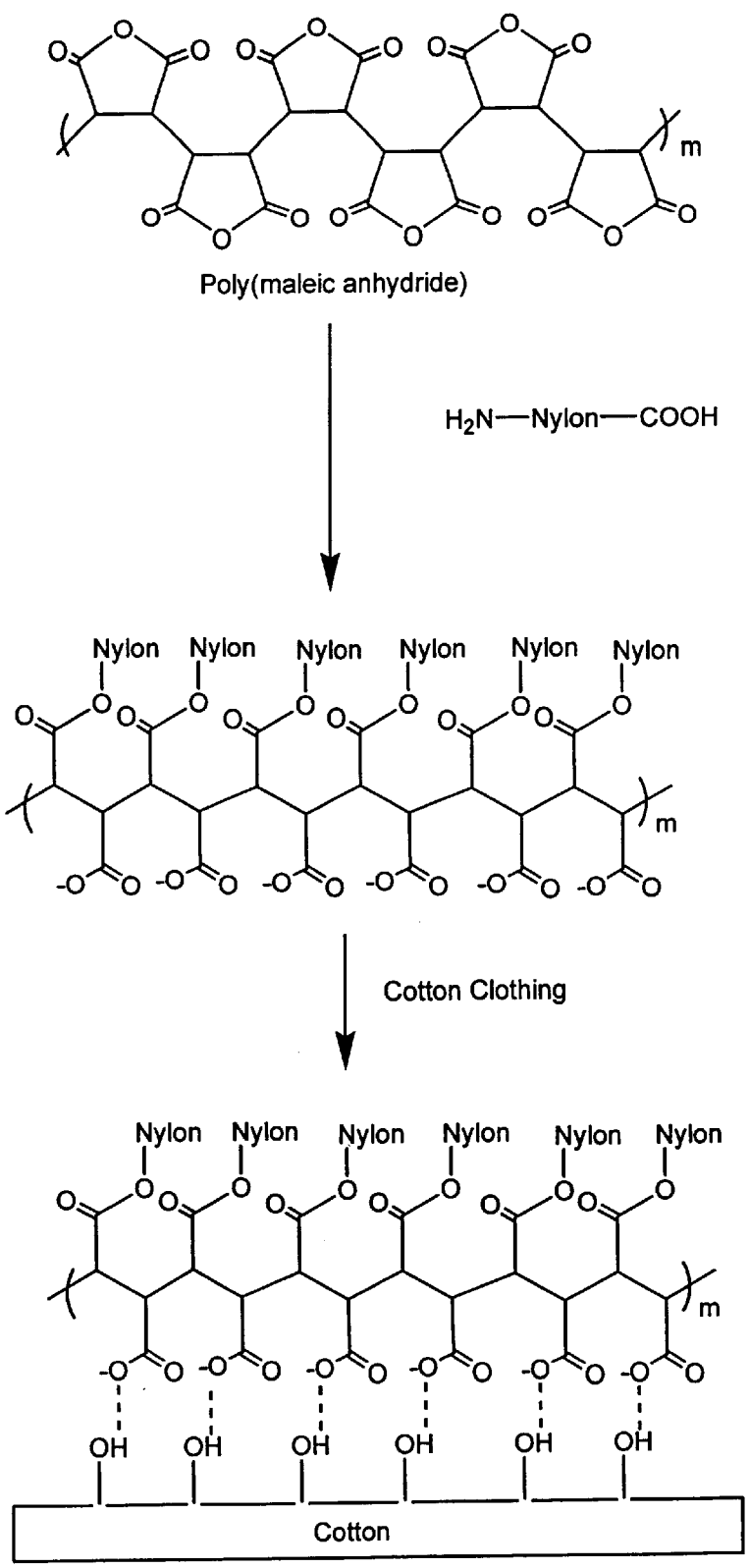
FIG. 15 is a scheme showing the reaction of a poly(maleic anhydride) polymer with the amine ends of nylon followed by the non-covalent attachment of the polymer to a cotton surface.

To produce an abrasion resistant, non-covalently bound finish on cotton, hydrogen bonds are formed between the abrasion resistant multifunctional polymer and the cotton, as shown in FIG. 15. In FIG. 15, m is, for example about 1 to 10,000, or e.g., about 1 to 1000. Poly(maleic anhydride) is reacted, for example, completely, with the amines of nylon to form a polymer containing both carboxylic acids, capable of hydrogen bonding to textiles, and abrasion resistant groups. The compound is then hydrogen bonded to cotton fibers or clothing from an aqueous solution. No catalyst is needed.

Figure 17:
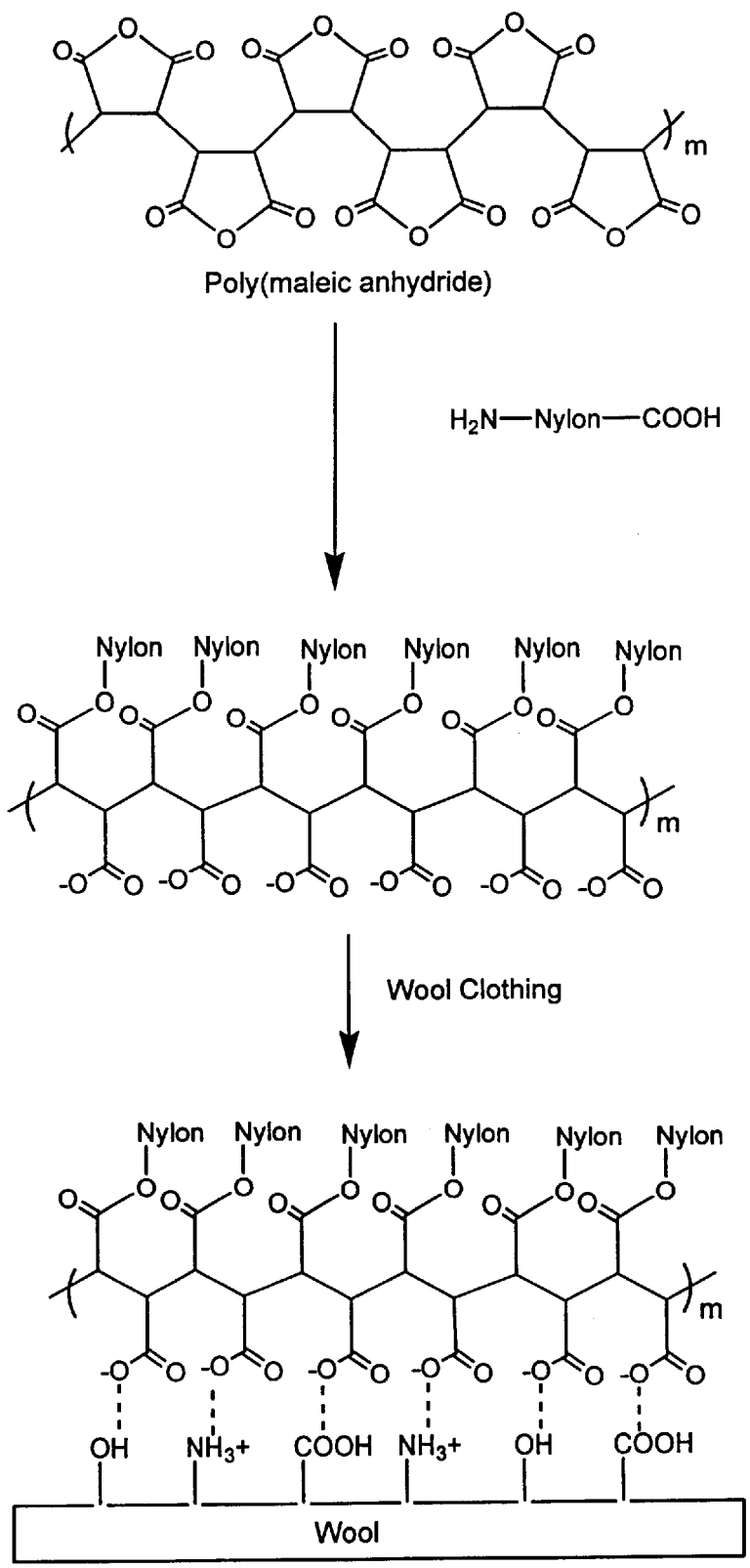
FIG. 17 is a scheme showing the reaction of a poly(maleic anhydride) polymer with the amine ends of nylon followed by the non-covalent attachment of the polymer to a wool surface.

Since wool also contains functional groups, such as serine hydroxyls and lysine amines, capable of forming hydrogen bonds to carboxylates, the above polymers may be physically bound in a similar fashion to impart abrasion resistance to wool fibers and fabric, as shown in FIG. 17. In FIG. 17, m is, for example about 1 to 10,000, or e.g., about 1 to 1000.

Use of a Poly(Carboxylic Acid) to Form a Natural Coating for Nylon and Wool

Compared to soft and comfortable fabrics such as cotton and rayon (composed of carbohydrates), nylon and wool sometimes feel uncomfortable against the skin. Therefore, giving nylon and wool the feel of cotton would be beneficial. To improve the feel of nylon and wool, multifunctional polymers comprising a comfortable molecule, carbohydrate, may be used to coat the surface of the fabric.

Figure 18:
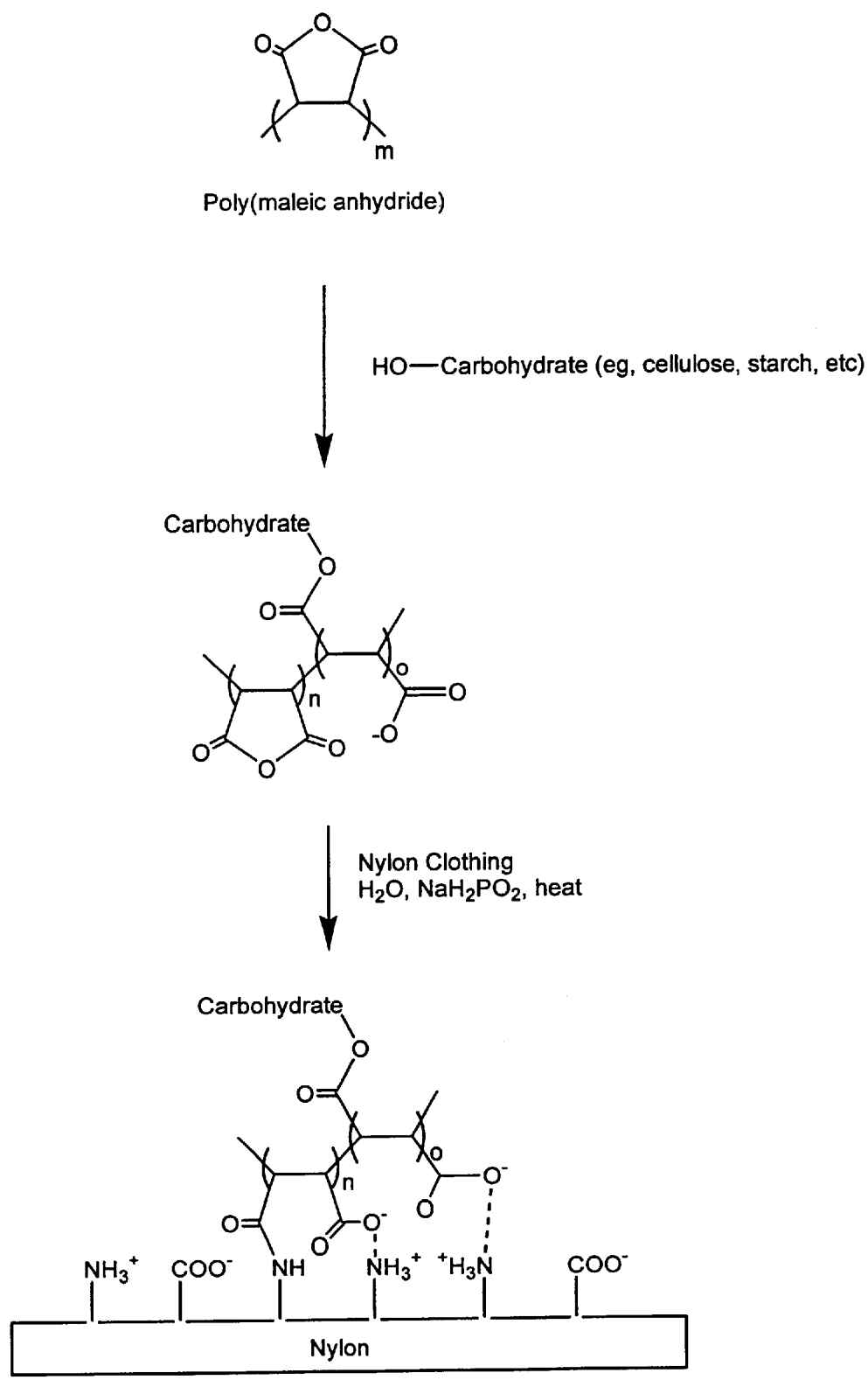
FIG. 18 is a scheme showing the reaction of a poly(maleic anhydride) polymer with a carbohydrate followed by the covalent attachment of the polymer to a nylon surface.

To produce a comfortable, covalently-bound finish on nylon, a multifunctional polymer is used that includes binding groups such as anhydride groups as well as carbohydrate groups, such as dextran, starch, or cellulose. In one embodiment, as shown in FIG. 18, poly(maleic anhydride) is partially reacted with the hydroxyls of carbohydrates, such as dextran, starch or cellulose, to form a polymer containing both nylon reactive (maleic anhydride) and comfort groups (carbohydrates). This multifunctional polymer then is covalently bound to nylon fibers or fabric using reaction conditions similar to the formation of durable press cotton with poly(carboxylic acids) (an aqueous solution containing the polymer and sodium hypophosphite catalyst). In FIG. 18, m, n and o are, for example, independently about 1 to 10,000, e.g., about 1 to 1000. For example, m is about 1 to 1000, and n and o are about 1 to 800. In the carbohydrate reacted polymer, for example, there can be for example independently about 1 to 10,000, or, e.g., about 1 to 1000 of the n and o subunits. The ratio of n:o is for example about 50:1 to 1:50, e.g., 1:1.

Figure 20:
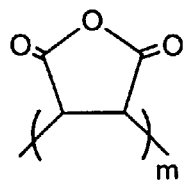
FIG. 20 is a scheme showing the reaction of a poly(maleic anhydride) polymer with a carbohydrate followed by the covalent attachment of the polymer to a wool surface.
Figure 20:
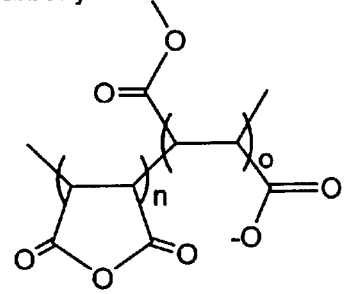
Figure 20:
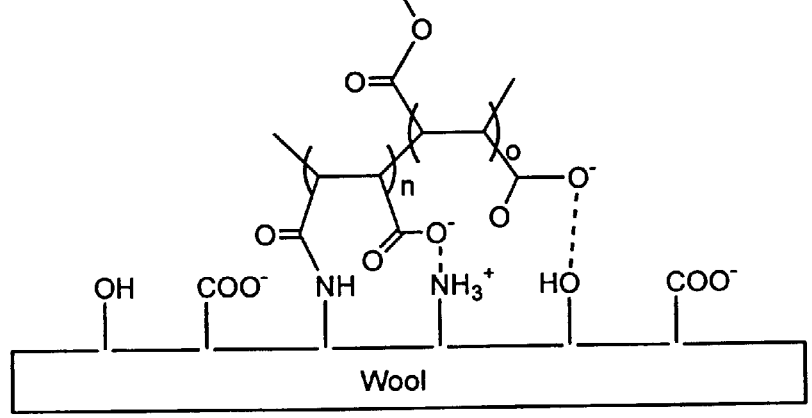

Since wool also contains functional groups, such as serine hydroxyls and lysine amines, capable of reacting with maleic anhydride, the above polymers may be covalently bound in a similar fashion to impart comfort properties to wool fibers and fabric, as shown in FIG. 20. In FIG. 20, m, n and o are, for example, independently about 1 to 10,000, e.g., about 1 to 1000. For example, m is about 1 to 1000, and n and o are about 1 to 800. In the carbohydrate reacted polymer, for example, there can be, for example, independently about 1 to 10,000, or, e.g., about 1 to 1000 of the n and o subunits. The ratio of n:o is, for example, about 1:50 to 50:1, e.g., 1:1.

Figure 19:
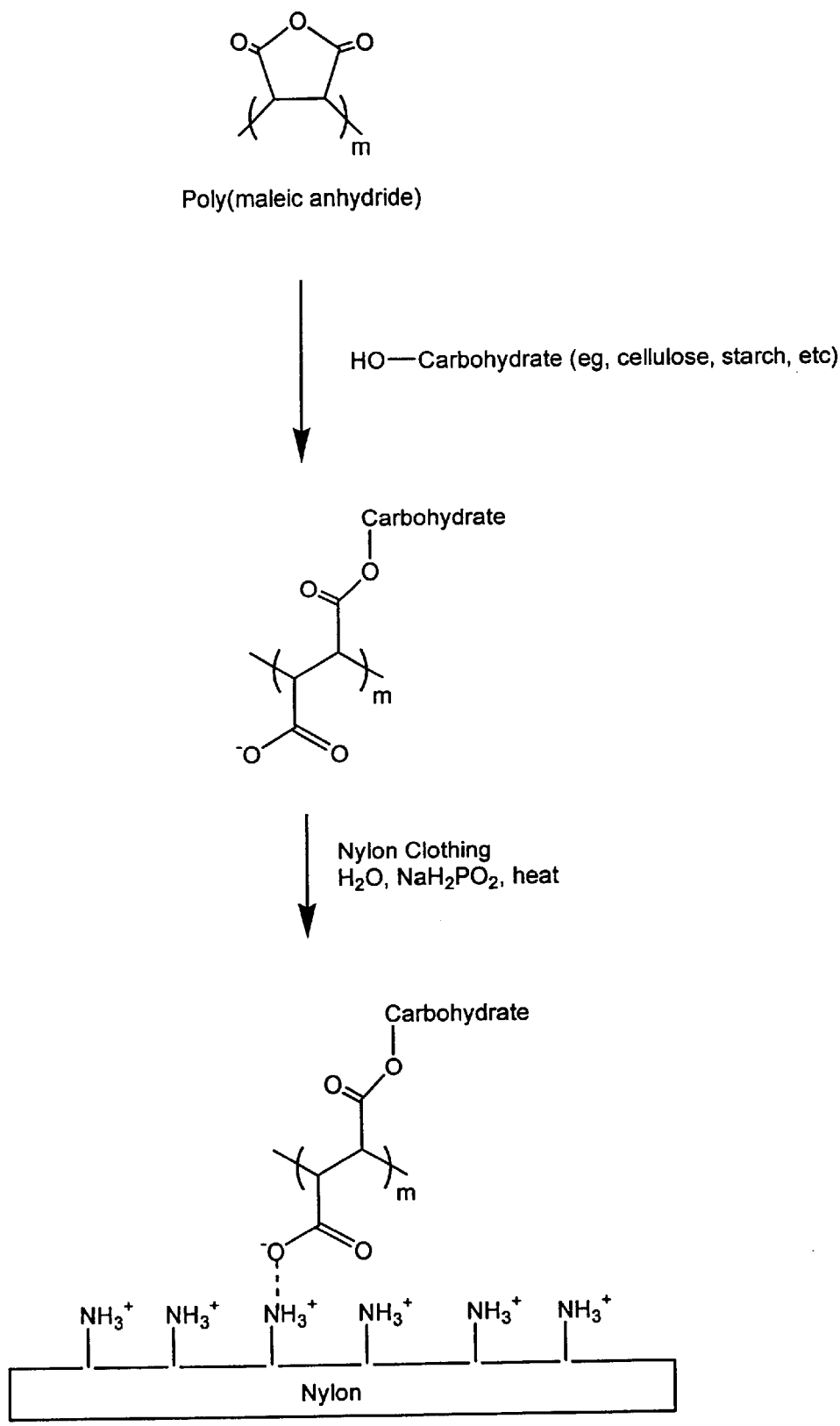
FIG. 19 is a scheme showing the reaction of a poly(maleic anhydride) polymer with a carbohydrate followed by the non-covalent attachment of the polymer to a nylon surface.

To produce a comfortable, non-covalently bound coating on nylon, hydrogen bonds are formed between the multifunctional polymer and nylon, as shown in FIG. 19. In FIG. 19, m is, for example about 1 to 10,000, or e.g., about 1 to 1000. Poly(maleic anhydride) is, for example, completely reacted with the hydroxyls of carbohydrates to form a polymer containing both carboxylic acids, capable on hydrogen bonding to nylon, and comfort groups. The polymer then is non-covalently physically bound to nylon fibers or fabric from an aqueous solution where the carboxylates hydrogen bond to the nylon amines. No catalyst is needed.

Figure 21:
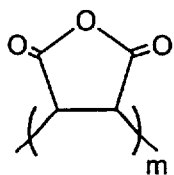
FIG. 21 is a scheme showing the reaction of a poly(maleic anhydride) polymer with a carbohydrate followed by the non-covalent attachment of the polymer to a wool surface.
Figure 21:
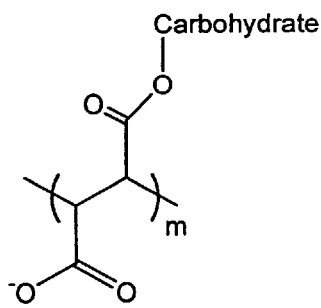
Figure 21:
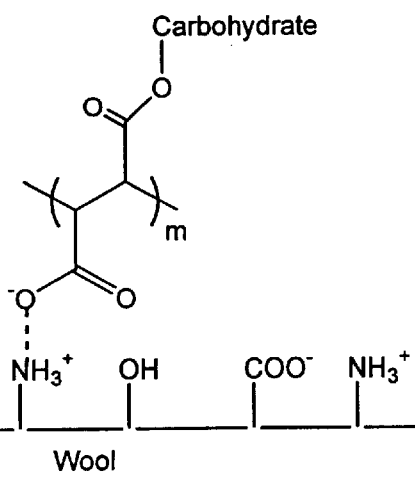

Since wool also contains functional groups (serine hydroxyls, lysine amines, etc) capable of forming hydrogen bonds to carboxylates, the above polymers may be physically bound in a similar fashion to impart comfort qualities to wool fibers and fabric, as shown in FIG. 21. In FIG. 21, m is, for example about 1 to 10,000, or e.g., about 1 to 1000.

Smart Polymers

In one embodiment, smart polymers may be covalently or noncovalently attached to materials such as cotton or wool. Such coatings are useful, for example, to impart quick drying properties on the materials.

Natural cotton is very hydrophilic and tends to bind water quite strongly. Therefore, a large amount of heat is required to remove water from a cotton garment. Vast amounts of energy are used worldwide each year in this drying process. Use of garments that require less drying time would result in significant global energy savings. Methods are advantageously provided that permit a significant reduction in the amount of time required to dry fabric.

In one embodiment, an upper critical solution temperature polymer, referred to as a smart or intelligent polymer is covalently attached to materials including cellulose materials, such as cotton. Such polymers are described, for example, in S. L. Rosen, *Fundamental Principles of Polymeric Materials*, John Wiley and Sons, Inc, New York, 1993, Chapter VII; and A. S. Hoffman, *Macromol. Symp.* 98:645–664 (1995). A smart polymer will respond to a small physical or chemical stimuli, such as pH, temperature, ions, solvents, and electric fields, with a large property change, such as phase, shape, optics, mechanics, surface energies, and permeation rate. A smart polymer that is relatively hydrophilic at room temperature in water and air can be covalently attached to a cellulose material, such as cotton fabric, for example to form a coating on the fabric. Upon raising the temperature, for example, in a clothes dryer, the polymer undergoes a phase transition to a hydrophobic state, thus liberating trapped water molecules within the fabric coating and reducing drying time. The temperature of the phase change depends on the molecular weight of the polymer and the interaction between the polymer, fabric, and water. Table III lists examples of polymers that display a lower critical solution temperature (LCST) in aqueous solutions useful for this application. Exemplary polymers include poly(ethylene oxide) (PEO), polypropylene oxide (PPO) polymers and copolymers.

Bifunctional compounds capable of crosslinking the smart polymers to cotton or wool can be used to covalently attach the polymer to the fabric. Possible crosslinkers include epichlorohydrin, glutaraldehyde, disuccinimidyl glutarate, glyoxal, carbonyl diamidizole, DMDHEU, and formaldeyhde.

TABLE III

Ether Groups

Poly (ethylene oxide) (PEO)
Poly (ethylene oxide/propylene oxide) copolymers
PEO/PPO/PEO triblock polymers
Alkyl-PEO block polymers
Poly (Vinyl methyl ether)

Alcohol Groups

Hydroxypropyl acrylate
Hydroxypropyl methylcellulose
Hydroxypropyl cellulose
Hydroxyethyl cellulose
Methylcellulose
Poly (vinyl alcohol) and derivatives Substituted Amide Groups Poly (N-substituted acrylamides)
Poly (N-acryloyl pyrrolidine)
Poly (N-acryloyl piperidine)
Poly (acryloyl-L-amino acid esters)
Poly (ethyl oxazoline)
Other Poly (methacrylic acid)

In another embodiment, a smart polymer that is a solid in air and a liquid in water or at basic pH may be covalently attached to a material such as a cellulose material such as cotton fabric using methods as described above. Thus, the fabric will release soils when placed in an aqueous detergent wash solution. Examples of such polymers include the hydrogels, as described, for example in D. DeRoss et al., Eds., Polymer Gels, Plenum Press, New York, 1991.

Covalent Attachment of Low Surface Energy Monomers and Polymers Increasing the abrasion resistance of fabric can dramatically increase its useful lifetime. In one embodiment, materials such as cellulose materials, such as cotton fabric may be coated by covalent attachment of low surface energy monomers or polymers, such as fluorocarbons, and high performance engineered polymers such as nylon and polyamides, to reduce friction, as disclosed herein. This coating thus protects the garment from wear and increases its durability characteristics. The polymers may be attached to cellulosic materials via the crosslinkers disclosed herein.

Applications

Water repellency is imparted by lowering the surface energy of the material, such as cotton fabric, below the surface tension of water, thus causing water to bead on the fabric. The formation of water repellent coatings is particularly useful for the production of water repellent outerwear, such as cotton or wool outerwear. The cotton or wool advantageously retains its breathability, flexibility and softness after modification. The hydrophobically modified material, such as cotton is useful in that it can be made in vibrant and varied colors and patterns, and is light weight, and comfortable. Cotton also is advantageous in that it is natural and inexpensive. Cotton and wool materials may be easily mass produced inexpensively and in a variety of colors, patterns and shades, with good and permanent water repellency. Water repellent characteristics are imparted on materials, such as cotton-containing materials, by attaching multifunctional molecules directly to the material.

Grease repellency properties may be imparted on a material, such as cotton or wool. In grease repellent materials, the surface energy of the materials must be reduced below that of grease. Typically, grease is a hydrocarbon having a surface tension similar to that of a hydrocarbon coating. Fluorocarbons are among the lowest surface energy substances known. Bain et al., *J. Am. Chem. Soc.*, 111:7155 (1989). When attached to materials such as fabric, multifunctional molecules comprising fluorocarbon moieties will sufficiently lower the energy of the fabric to produce grease and water repellency.

When cotton fabric is immersed in water or heated, the weak forces (hydrogen bonds and van der Waals attractions) that hold the cellulose chains in place break and the chains become free to move. Upon drying and cooling, the chains freeze into whatever position they happen to be in. This physical process is known as wrinkling. Cotton materials may be modified to improve their permanent press properties, with minimal loss of performance properties such as strength and abrasion resistance. Wool can wrinkle in a similar matter. Multifunctional molecules may be attached to materials, such as cotton or wool, to enhance the permanent press character, while retaining many attributes associated with the original natural fibers. The extent of modification will determine the durability of permanent press.

A variety of materials can be modified as disclosed herein, including various textile fiber materials in a variety of forms, such as fabric, yarn, and thread or finished articles of apparel or home furnishings fabrics. The surfaces of a variety of materials can be modified to alter properties, such as hydrophobicity. The surface of these filters, paper or wood, including wood furniture, and upholstery fabric can be treated as disclosed herein. The modified materials, such as cellulose cotton materials, or cotton containing materials, as well as wool, or other fibers, alone or blended with one or more other fibers produced as described herein may be used to form a variety of articles. For example, a variety of clothing and apparel items may be produced using the cotton cellulose materials, such as cloth or fabric for various end uses, including shirts, pants, bathing suits, jackets and shoes. A variety of articles of furniture may be produced including outdoor furniture or furniture coverings. Other items include furniture upholstery, curtains, and bedding items, and bedsheets or bedspreads and comforters, as well as pillows or pillow coverings, and floor coverings such as carpets, area rugs, throw rugs and mats of various types. Articles for outdoor use may be produced including car upholstery and paneling or furniture coverings, air filters such as automobile air filters, tents, umbrellas, and beach equipment.

What is claimed is:

1. A textile material produced by the method comprising attaching a multifunctional polymer to the material, wherein the multifunctional polymer is capable of non-covalently or covalently binding the material; and wherein the multifunctional polymer comprises a modified poly(maleic anhydride) polymer comprising a poly(maleic anhydride) polymer covalently attached to a hydrophobic molecule via an ester or amide bond; and wherein the multifunctional polymer is applied as an aqueous solution to the material.

2. A modified cellulosic or polyamide material comprising a cellulosic or polyamide material having covalently bonded thereto a multifunctional polymer comprising a modified poly(maleic anhydride) polymer comprising a poly(maleic anhydride) polymer covalently attached to a hydrophobic molecule via an ester or amide bond.

3. A textile material according to claim 1, wherein the hydrophobic molecule has the formula R-X, where R is a C4–C24 hydrocarbon or fluorocarbon and X is OH, $NH_2$ or SH.

4. A textile material according to claim 1 wherein the modified poly(maleic anhydride) polymer is covalently attached to the material via the formation of ester or amide bonds between the polymer and the material.

5. A textile material claim 1 wherein the material comprises hydroxyl or amine groups.

6. A textile material produced by the method comprising attaching a multifunctional polymer to the material, wherein the multifunctional polymer is capable of non-covalently or covalently binding the material; and wherein the multifunctional polymer comprises a modified poly(maleic anhydride) polymer comprising covalently attached polysaccharide groups; and wherein the multifunctional polymer is applied as an aqueous solution to the material.

7. A textile material according to claim 6, wherein the polysaccharide groups are dextran, starch or cellulosic groups.

8. A textile material according to claim 7, wherein the material is wool or nylon.

9. A modified cellulosic or polyamide material according to claim 2, wherein the hydrophobic molecule has the formula R-X, where R is a C4–C24 hydrocarbon or fluorocarbon and X is OH, $NH_2$ or SH.

10. A modified cellulosic or polyamide material according to claim 2, wherein the modified poly(maleic anhydride) polymer is covalently attached to the material via the formation of ester or amide bonds between the polymer and the material.

11. A modified cellulosic or polyamide material comprising a cellulosic or polyamide material having covalently bonded thereto a multifunctional polymer comprising a modified poly(maleic anhydride) polymer comprising covalently attached polysaccharide groups.

12. A textile material according to claim 11, wherein the polysaccharide groups are dextran, starch or cellulosic groups.

* * * * *